US011628358B2

(12) United States Patent
Sensui et al.

(10) Patent No.: US 11,628,358 B2
(45) Date of Patent: *Apr. 18, 2023

(54) COMPUTER-READABLE NON-TRANSITORY STORAGE MEDIUM HAVING INFORMATION PROCESSING PROGRAM STORED THEREIN, INFORMATION PROCESSING APPARATUS, INFORMATION PROCESSING SYSTEM, AND INFORMATION PROCESSING METHOD

(71) Applicant: NINTENDO CO., LTD., Kyoto (JP)

(72) Inventors: Kazuyoshi Sensui, Kyoto (JP); Junpei Horita, Kyoto (JP); Kei Hoshiba, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/532,758

(22) Filed: Nov. 22, 2021

(65) Prior Publication Data
US 2022/0080309 A1 Mar. 17, 2022

Related U.S. Application Data

(63) Continuation of application No. 16/785,894, filed on Feb. 10, 2020, now Pat. No. 11,224,805.

(30) Foreign Application Priority Data

Feb. 22, 2019 (JP) .............................. JP2019-030710

(51) Int. Cl.
*A63F 13/46* (2014.01)
*A63F 13/537* (2014.01)

(52) U.S. Cl.
CPC ............ *A63F 13/46* (2014.09); *A63F 13/537* (2014.09)

(58) Field of Classification Search
CPC .......... A63F 13/46; A63F 13/537; A63F 13/80
See application file for complete search history.

(56) References Cited

U.S. PATENT DOCUMENTS 9,821,231 B2 11/2017 Kurebayashi
10,099,136 B2 10/2018 Kurebayashi
(Continued)

FOREIGN PATENT DOCUMENTS

JP 6886991 B2 6/2021

OTHER PUBLICATIONS

Nintendo Co., Ltd., "Animal Crossing CITY FOLK", [online, Feb. 18, 2019], https://www.nintendo.co.jp/wii/ruuj/town/index.html, 4 pages, with partial translation.
(Continued)

*Primary Examiner* — Seng H Lim
(74) *Attorney, Agent, or Firm* — Nixon & Vanderhye P.C.

(57) ABSTRACT

Provided is a computer-readable non-transitory storage medium having an information processing program stored therein that, in a game in which a predetermined condition is set as an achievement goal, makes it unnecessary to start the game over again even if the predetermined condition is not achieved. At least one game object selected from among game objects possessed by a user is arranged within a game space, and a score is calculated on the basis of the game object. If the score satisfies an achievement condition, an in-game effect corresponding to the achievement condition is caused. If the score does not satisfy the achievement condition but satisfies a sub-achievement condition that is not satisfied simultaneously with the achievement condition, change of a game state is performed so as to cause the in-game effect corresponding to the achievement condition in exchange for change of an exchange parameter.

22 Claims, 22 Drawing Sheets

(56) References Cited

U.S. PATENT DOCUMENTS

| | | | |
|---|---|---|---|
| 2013/0222393 A1* | 8/2013 | Merrell | G06T 19/00 |
| | | | 345/441 |
| 2015/0298002 A1 | 10/2015 | Yokota | |
| 2017/0157515 A1 | 6/2017 | Kurebayashi | |
| 2017/0197147 A1* | 7/2017 | Kurebayashi | A63F 13/58 |
| 2022/0080309 A1* | 3/2022 | Sensui | A63F 13/80 |

OTHER PUBLICATIONS

Notice of Reasons for Refusal for Japanese Application No. 2021-083067, six pages dated Feb. 7, 2023.

* cited by examiner

| FURNITURE ARTICLE ID | FURNITURE ARTICLE TYPE INFORMATION | SUITED THEME | NAME | MODEL DATA |
|---|---|---|---|---|
| 0100 | DESK | COUNTRY | COUNTRY DESK | ... |
| 0101 | CHAIR | COUNTRY | COUNTRY CHAIR | ... |
| 0102 | SHELF | MODERN | MODERN SHELF | ... |
| ⋮ | ⋮ | ⋮ | ⋮ | ⋮ |

| OPERATION ORDER INFORMATION (541) | AREA POSITION INFORMATION (542) | CORRESPONDING FURNITURE ARTICLE TYPE INFORMATION (543) | RECOMMENDED FURNITURE ARTICLE INFORMATION (544) |
|---|---|---|---|
| 01 | .... | DESK | 0102 |
| 02 | .... | SHELF | 0219 |
| 03 | .... | CHAIR | 0168 |
| ⋮ | ⋮ | ⋮ | ⋮ |

| PASS LINE NUMERAL (551) | PASS SCORE INFORMATION (552) | ADVICE LINE INFORMATION (553) |
|---|---|---|
| 01 | 72 | 54 |
| 02 | 120 | 108 |
| 03 | 200 | 192 |
| ⋮ | ⋮ | ⋮ |

COMPUTER-READABLE NON-TRANSITORY STORAGE MEDIUM HAVING INFORMATION PROCESSING PROGRAM STORED THEREIN, INFORMATION PROCESSING APPARATUS, INFORMATION PROCESSING SYSTEM, AND INFORMATION PROCESSING METHOD

CROSS REFERENCE TO RELATED APPLICATION

This application is a continuation of U.S. patent application Ser. No. 16/785,894, filed Feb. 10, 2020, now allowed; which claims priority to Japanese Patent Application No. 2019-030710, filed on Feb. 22, 2019, the entire contents of which are hereby incorporated by reference.

FIELD

The exemplary embodiments relate to information processing using game objects possessed by a user.

BACKGROUND AND SUMMARY

Hitherto, a game, in which "evaluation" is performed on a room that is constructed within a virtual space and in which predetermined furniture article objects are arranged by a user, and the user can acquire a commemorative item if a score is equal to or higher than a reference score as a result of the "evaluation", has been known.

In the above game, if the score has not reached the reference score as a result of the "evaluation", the user needs to rearrange furniture article objects in the room, and the "evaluation" needs to be performed again. That is, if the score has not reached the reference score, a series of flow from arrangement of furniture article objects to the "evaluation" needs to be done again from the beginning.

Therefore, it is an object of the exemplary embodiments to provide a computer-readable non-transitory storage medium having an information processing program stored therein, an information processing apparatus, an information processing system, and an information processing method that, in a game in which a predetermined condition is set as an achievement goal, make it unnecessary to start the game over again even if the predetermined condition is not achieved.

In order to attain the object described above, for example, the following configuration examples are exemplified.

A configuration example is directed to a computer-readable non-transitory storage medium having stored therein an information processing program to be executed in a computer of an information processing apparatus, the information processing program causing the computer to: arrange at least one game object selected from among game objects possessed by a user, within a game space; calculate a score on the basis of the game object arranged within the game space; determine that the score satisfies an achievement condition, if the score is equal to or higher than a first score, and determine that the score does not satisfy the achievement condition and satisfies a sub-achievement condition, if the score is less than the first score and equal to or higher than a second score; cause an in-game effect corresponding to the achievement condition if the score satisfies the achievement condition; perform control such that, if it is determined that the score satisfies the sub-achievement condition, change of a game state is performed so as to cause the in-game effect in exchange for change of an exchange parameter, and, if it is determined that the score does not satisfy both the achievement condition and the sub-achievement condition, the change of the game state is not performed; and give a predetermined reward to the user if the score satisfies the achievement condition.

According to the above configuration example, if the achievement condition is not satisfied but the sub-achievement condition is satisfied, a process of changing the game state so as to cause the same game state as when the achievement condition is satisfied is performed in exchange for changing a predetermined parameter. Accordingly, the user can save time in exchange for change of the predetermined parameter. In particular, when time-consuming work such as generation or collection of a game object for achieving the achievement condition is required, it is also possible to prevent the user from, for example, abandoning the game or giving up play due to lack of time. In addition, if the sub-achievement condition has not been reached, the above change of the game state is not performed, and the originally assumed fun of the game can be provided to the user. Moreover, since the reward is given if the achievement condition is achieved, the user's motivation to play the game can be improved.

In another configuration example, the information processing program may cause the computer to arrange the at least one game object within the game space such that the score satisfies the achievement condition.

According to the above configuration example, the user is allowed to recognize the game object that satisfies the achievement condition, and the game space after achievement can be shown to the user.

In another configuration example, the information processing program may cause the computer to arrange the game object within the game space regardless of whether the user possesses the game object.

According to the above configuration example, even the game object that is not possessed by the user is arranged. Accordingly, even when the achievement condition can be achieved only with any game object possessed by the user, it is possible to satisfy the achievement condition. In addition, motivation to own an unpossessed game object can also be improved.

In another configuration example, the information processing program may cause the computer to: calculate the score by summing sub scores calculated respectively for arrangement locations at which the game objects are to be arranged; and select the arrangement location in ascending order of the sub score and arranging the game object at the selected arrangement location.

According to the above configuration example, the arranged game objects are replaced in ascending order of the sub score. Thus, the user is allowed to recognize the game object having a low sub score.

In another configuration example, the information processing program may cause the computer to show, to the user, the game object with which a sub score calculated for each arrangement location is calculated as a maximum value.

According to the above configuration example, the game object by which the achievement condition can be satisfied is known to the user. Accordingly, the user may perform an operation for arranging this game object if the user owns this game object, and the motivation to acquire this game object can be improved if the user does not own this game object.

In another configuration example, the information processing program may cause the computer to determine whether the sub-achievement condition that is set on the basis of a proportion to a score that is set as the achievement condition is satisfied.

According to the above configuration example, each sub-achievement condition is set at a proportion to the score of the achievement condition. Accordingly, it is possible to simply set a state where the score is a little short of the achievement condition, as the sub-achievement condition.

In another configuration example, the information processing program may cause the computer to determine whether the score satisfies any of a plurality of the achievement conditions and the sub-achievement conditions respectively corresponding to the plurality of the achievement conditions.

According to the above configuration example, a plurality of achievement conditions can be set stepwise in one game. Therefore, it is possible to provide motivation to entertain the same game over and over again in order to achieve all the achievement conditions. Thus, it is also possible to allow the user to enjoy the game over a long period of time.

In another configuration example, the information processing program may cause the computer to set each of the sub-achievement conditions corresponding to the achievement conditions, to be a condition that is closer to the achievement condition as a degree of difficulty in achievement of the achievement condition becomes higher. In addition, the information processing program may cause the computer to set each of the sub-achievement conditions such that a difference between a score that satisfies the achievement condition and a score that satisfies the sub-achievement condition becomes smaller as the degree of difficulty in achievement of the achievement condition becomes higher.

According to the above configuration example, regarding the achievement condition having the lowest degree of difficulty (the achievement condition that will be achieved first), the determination as to this sub-achievement condition is made lax, whereby the opportunity to receive support under the sub-achievement condition can be increased for beginners inexperienced in the game. Accordingly, the fun or a sense of accomplishment when the achievement condition is satisfied can also be provided to users inexperienced in the game, and it is possible to make it less likely to lose interest in the game.

In another configuration example, the information processing program may cause the computer to present a score indicated by the achievement condition and the calculated score such that the scores are recognizable by the user.

According to the above configuration example, the user is allowed to visually recognize the relationship between the achievement condition and the own score. Accordingly, the user is allowed to recognize their skill, ability, etc., in the game, leading to improvement in motivation to achieve the achievement condition.

In another configuration example, the information processing program may cause the computer to perform control such that the sub-achievement condition is not presented to the user.

According to the above configuration example, the sub-achievement condition can be prevented from being notified to the user. Accordingly, a decrease in the fun of the game due to the user aiming at the sub-achievement condition from the beginning can be prevented.

In another configuration example, the information processing program causes the computer to cause the in-game effect in exchange for decreasing the exchange parameter that is increased by payment of money.

In another configuration example, the information processing program may cause the computer to output a selection image for causing the user to select the game object to be arranged within the game space, from among the game objects possessed by the user. Furthermore, the information processing program may cause the computer to extract the game objects in such an order that sub scores thereof are relatively higher, from among the game objects possessed by the user such that an upper limit of the number of the extracted game objects is a display upper limit, and include the extracted game objects in the selection image.

According to the above configuration example, a game object that is advantageous for satisfying the achievement condition can be displayed as a selection image of a game object. Accordingly, the game object that is advantageous for satisfying the achievement condition can be presented such that the user easily selects this game object. In addition, time and effort for the user to find such an advantageous game object can be reduced.

In another configuration example, the information processing program may cause the computer to output the selection image including the game objects such that the order that the sub scores are relatively higher is not identifiable.

According to the above configuration example, a game object that is advantageous for satisfying the achievement condition is picked up and presented to the user such that whether this game object has a high score is not recognized by the user. Thus, the convenience of the user can be enhanced, and the fun of considering or selecting which game object gives a high score or the user selecting such a game object can also be provided to the user.

In another configuration example, the information processing program may cause the computer to output the selection image such that a high-score game object that is defined to make the score highest is identifiable, if the extracted game objects include the high-score game object.

According to the above configuration example, when the user possesses a high-score game object, the high-score game object can be fixedly displayed in the selection image. Accordingly, the user is allowed to easily recognize which game object is the most effective and that the user possesses this game object. In addition, time and effort for the user to perform an operation for finding such a high-score game object can be reduced.

In another configuration example, the information processing program may cause the computer to output a proposal image presenting the game object effective for making the score closer to the achievement condition to the user, if the score does not satisfy the achievement condition and the change of the game state by which the same in-game effect as when the achievement condition is satisfied is obtained is not performed.

According to the above configuration example, if the achievement condition is not satisfied and the change of the game state by which the same in-game effect as when the achievement condition is satisfied is not performed, the game object that can give a higher score can be presented to the user. Accordingly, the user's motivation to acquire such a game object and re-challenge the game can be enhanced.

In another configuration example, the information processing program may cause the computer to include, in the proposal image, an image for guiding the user to acquire the game object that is not possessed by the user and that is effective for making the score closer to the achievement condition.

According to the above configuration example, time and effort for the user to perform an operation for displaying an image for acquiring an effective game object can be reduced. In addition, a user who sees the proposal image and thinks that the user desires to acquire the game object shown in the proposal image can be guided to a state where this game object can be smoothly acquired with good tempo. Thus, the user is allowed to continue to play the game without decreasing the user's interest in this game object or motivation to acquire this game object.

According to the exemplary embodiments, if the achievement condition is not satisfied but the sub-achievement condition is satisfied, a process of changing the game state so as to cause the same game state as when the achievement condition is satisfied can be performed in exchange for changing a predetermined parameter. Accordingly, the user does not need to start over from the beginning and thus can save time. In addition, if the sub-achievement condition is also not achieved, the above change of the game state is not performed, and the originally assumed fun of the game can also be provided to the user.

BRIEF DESCRIPTION OF THE DRAWINGS

FIG. 17 illustrates a non-limiting example of the data structure of arrangement area data 534;

FIG. 18 illustrates a non-limiting example of the data structure of pass line data 535;

DETAILED DESCRIPTION OF NON-LIMITING EXAMPLE EMBODIMENTS

[Hardware Configuration of Information Processing Terminal]

Figure 1:
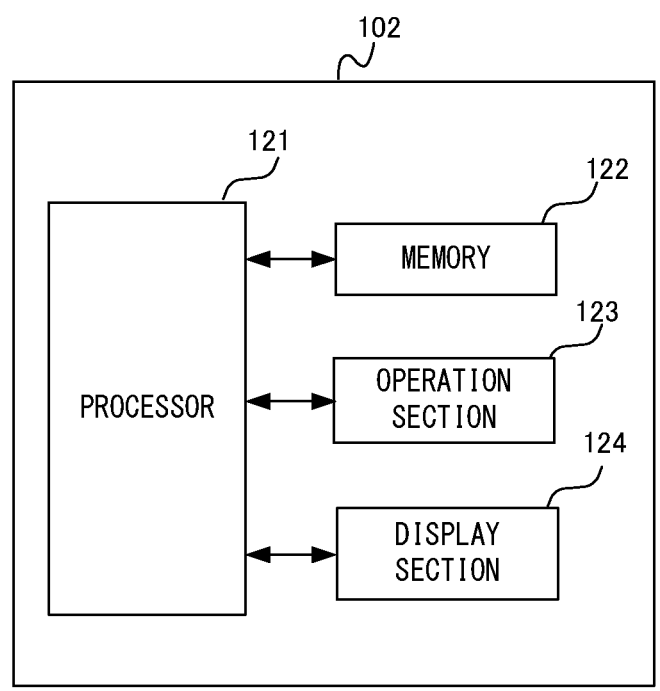
FIG. 1 is a block diagram illustrating a non-limiting example of the hardware configuration of an information processing terminal 102.

Hereinafter, one exemplary embodiment will be described. It is to be understood that, as used herein, elements and the like written in a singular form with a word "a" or "an" attached before them do not exclude those in the plural form. FIG. 1 is a block diagram illustrating the hardware configuration of an information processing terminal 102 in which information processing according to the exemplary embodiment. Here, in the exemplary embodiment, for example, a smart device such as a smartphone and a tablet, a stationary game apparatus, a hand-held game apparatus, a personal computer, or the like is assumed as the information processing terminal 102. In the description of the exemplary embodiment, an information processing terminal (for example, a smartphone) including a display screen and a touch panel that are integrated with each other will be described as an example. Therefore, input operations are mainly inputs to the touch panel. However, in another exemplary embodiment, for input operation, a physical controller connected to an information processing terminal wirelessly or via a wire may be employed, or, for example, an input device formed integrally with the information processing terminal may be employed. Moreover, regarding the information processing terminal 102, in another exemplary embodiment, an information processing system that includes a plurality of information processing apparatuses may be employed. Processing described below may be shared and performed by the plurality of information processing apparatuses.

In FIG. 1, the information processing terminal 102 includes a processor 121, a memory 122, an operation section 123, and a display section 124. The processor 121 executes later-described game processing or executes a system program (not shown) for controlling overall operation of the information processing terminal 102, thereby controlling operation of the information processing terminal 102. The processor 121 may include a single processor or a plurality of processors. In the memory 122, various programs to be executed by the processor 121 and various kinds of data to be used in the programs are stored. The memory 122 is, for example, a flash EEPROM or a hard disk device. The operation section 123 is an input device for receiving an operation from a user, and outputs a signal indicating an input content, to the processor 121. In the exemplary embodiment, a touch panel is mainly assumed as the operation section 123. In another exemplary embodiment, the operation section 123 may be various pointing devices, various press-type buttons, an analog stick, or the like. The display section 124 displays a game image generated as a result of game processing, etc., and is, for example, a liquid crystal display device.

[Outline of Information Processing (Game Processing) of Exemplary Embodiment]

Next, the outline of information processing performed in the exemplary embodiment will be described. In this example, game processing is assumed as an example of the information processing. The game assumed in the exemplary embodiment is a game in which a user virtually lives as a player character in a virtual game space in which various virtual characters (resident characters) live. For example, in the game, the user can collect various items and build an article, or can maintain a garden. Moreover, in the game, the user can acquire various items by collection, fishing, or the like, or by conversation with a resident character, or the like. Furthermore, in the game, the user can "produce" a "furniture article object" (hereinafter, simply referred to as furniture article), which is a type of the above article and which can be arranged in a user's own house, by using "material items" acquired in the game.

Moreover, regarding the method for acquiring the "furniture article", the "furniture article" can be acquired by performing a predetermined lottery process in the game, other than by "production" as described above. The furniture article that can be acquired by the lottery process may be a furniture article that cannot be acquired by "production", or may be a furniture article that can be acquired by "production". In the game according to the exemplary embodiment, the furniture article that can be acquired by the lottery process is the former. As described above, the game has an aspect of providing the fun of collecting furniture articles by "production" or the lottery process, to a player.

Meanwhile, in the game assumed in the exemplary embodiment, a content that is a "furniture selection game" is present as one of contents in the game. This game is a kind of mini game for using "furniture articles" collected as described above. The processing assumed in the exemplary embodiment relates to the furniture selection game. Hereinafter, the outline of the furniture selection game will be described.

Figure 2:
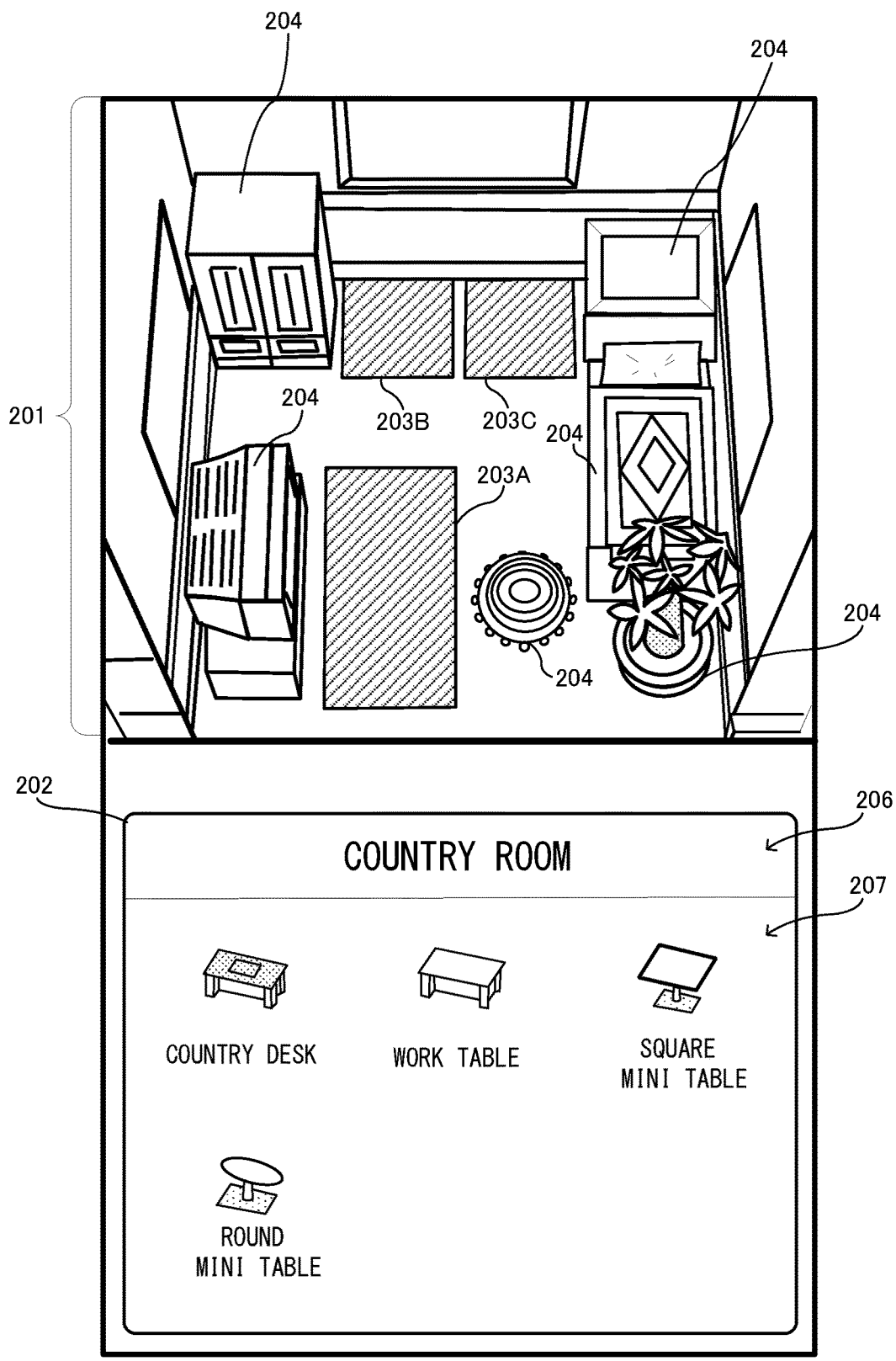
FIG. 2 illustrates a non-limiting example of a game image.

FIG. 2 illustrates an example of a game image in the furniture selection game of this example. In the furniture selection game, "question stages" that are presented as questions are predefined. The example in FIG. 2 is an example in which a room stage 201 (hereinafter, simply referred to as "room") is displayed as a "question stage". The room 201 is displayed in substantially the upper half of the game image. In addition, in the example in FIG. 2, a later-described furniture article list 202 is displayed in substantially the lower half of the game image. As a question stage, other than an "indoor space" such as a "room", for example, "outdoors" (in the virtual space) such as a campsite may be used. The furniture selection game is a game in which the user tries to acquire a high score by arranging appropriate furniture articles suited to the room 201 (the atmosphere or theme of the room 201), among furniture articles possessed by the user (hereinafter, referred to as possessed furniture articles), in "arrangement areas" for furniture that is set for each stage. More specifically, the furniture selection game is a game in which the user tries to acquire a score equal to or higher than a later-described "pass line". To play the furniture selection game, so-called "stamina" or the like may be consumed. That is, a parameter that recovers over time may be consumed.

Next, the configuration of the game image described above will be described. FIG. 2 illustrates an image obtained by photographing the room 201, which is presented as a "question stage", from above with a virtual camera. In the room 201, arrangement areas 203A, 203B, and 203C (hereinafter, sometimes collectively referred to simply as arrangement areas) are provided. These areas are each an area in which no furniture article is arranged in the initial state and which is an area for the user to arrange a furniture article. In addition, a plurality of hint furniture articles 204 are arranged in the room 201. In the example in FIG. 2, a television, a closet, a desk, a bed, a houseplant, and a light are arranged as the hint furniture articles as seen clockwise from the lower left.

The number of the arrangement areas 203 may be different for each question stage.

In this example, the "question stages" are each configured according to a certain "theme". The theme is an element indicating the atmosphere of the room such as "country", "modern", and "fancy". Then, the user selects and arranges a furniture article that is considered to be appropriate for the room, by referring to the theme of the "question stage" and the hint furniture articles. That is, the furniture selection game can be considered as a game that makes the user think of appropriate furniture coordination for a room that is presented as a question.

Here, the furniture selection game is advanced through the following three processing stages when being roughly divided. First, a process regarding "furniture arrangement operation" is performed. Thereafter, a process regarding "scoring" is performed, and a process regarding "result display" is finally performed.

[Outline of Furniture Arrangement Operation]

Next, a furniture arrangement operation will be described with a specific example. First, a theme of "country" is set for the room 201 illustrated in FIG. 2 described above. Types of furniture articles, "desk", "shelf", and "chair", are set as objects to be arranged, for the three arrangement areas 203, respectively. In addition, each arrangement area 203 and a type of furniture article are associated with each other in a one-to-one relationship. Specifically, "desk" is set as an object to be arranged, for the arrangement area 203A in FIG. 2. In addition, "shelf" is set as an object to be arranged, for the arrangement area 203B, and "chair" is set as an object to be arranged, for the arrangement area 203C. Moreover, an operation order for performing an arrangement operation is set for the arrangement areas 203. In this example, operations are performed in the order of the arrangement area 203A, the arrangement area 203B, and the arrangement area 203C. Specifically, when arranging a furniture article in the arrangement area 203A is finished, a shift is automatically made to display that promotes selection of a furniture article for the arrangement area 203B. When arranging a furniture article in the arrangement area 203B is finished, a shift is automatically made to display that promotes selection of a furniture article for the arrangement area 203C.

Here, a supplemental description of types and the like of "furniture articles" will be given. For each furniture article in the game, "type" and "suited theme" are predefined. The "type" is an element that defines the type of the furniture article, such as "desk", "chair", "shelf", "bed", "light", and "household electric appliance". In addition, the "suited theme" is an element that defines which of the above-described themes the furniture article is suited to. In the exemplary embodiment, a score is set for each furniture article such that a higher score is acquired with a furniture article suited to the "suited theme". For example, in the case where "country" is defined as the suited theme of a "desk A", and "modern" is defined as the suited theme of a "desk B", a higher score is acquired (or is highly likely to be acquired) when the "desk A" is arranged in the above-described room 201, which has a theme of "country", than when the "desk B" is arranged in the room 201.

Figure 3:
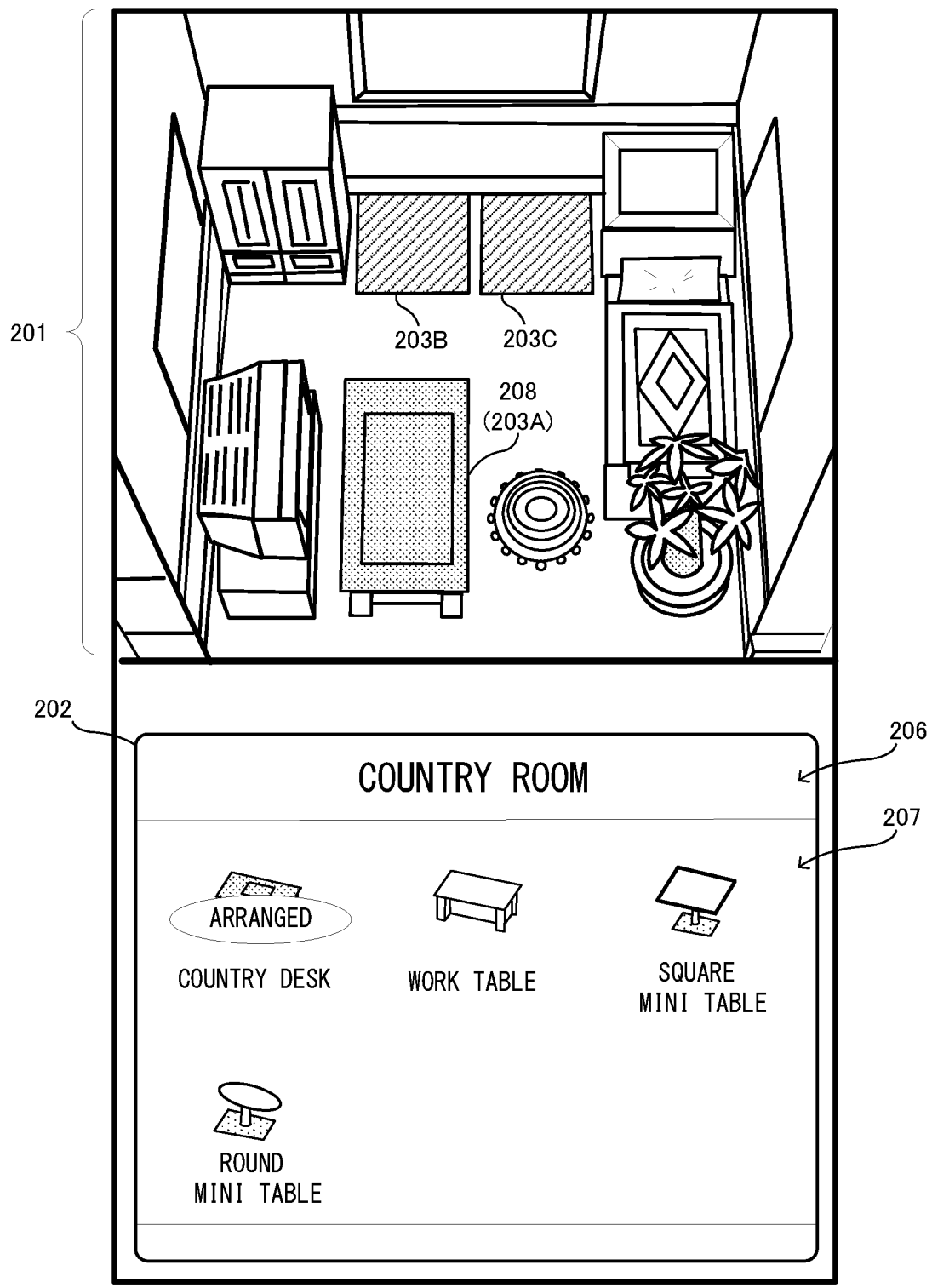
FIG. 3 illustrates a non-limiting example of a game image.

Next, a specific example of an arrangement operation will be described. Here, an example of an operation of arranging a furniture article in the arrangement area 203A will be described. When the user arranges a furniture article, the furniture article list 202 is displayed in substantially the lower half of the game image. In the example in FIG. 2, in the furniture article list 202, a text showing the name of the question stage ("COUNTRY ROOM" in FIG. 2) is displayed in a name area 206 at the top. Furthermore, four names and four images showing "desks" are displayed in a selection area 207 below the name area 206. In this example, the type of furniture articles to be arranged in the arrangement area 203A is "desk". Thus, images of furniture articles, the type of each of which is "desk", and the names thereof are displayed in the furniture article list 202. Then, the user performs a tapping operation on any of the furniture articles displayed in the furniture article list 202, whereby the tapped furniture article is automatically arranged in the arrangement area 203A. At this time, the user may be further caused to designate the orientation of the furniture article, or designation of the orientation of the furniture article by the user may be unnecessary. In the game, the latter case is employed. Thus, in the game, a furniture article can be arranged, through a single tapping operation, including the orientation of the furniture article. For example, in the example in FIG. 2, it is assumed that the user performs a tapping operation on the furniture article (country desk) displayed at the upper left of the selection area 207 of the furniture article list 202. In this case, as shown in FIG. 3, a furniture article object 208 corresponding to the selected furniture article is arranged in an appropriate orientation in the arrangement area 203A. At this time, in the selection area 207, display showing that the furniture article has been arranged is superimposed at the position at which the arranged furniture article is displayed.

The maximum number of furniture articles that can be displayed in (the selection area 207 of) the furniture article list 202 is 12 in this example. Here, a supplemental description of a method for selecting furniture articles to be included in the furniture article list will be given. First, a predetermined score is assigned to each furniture article in consideration of the theme, etc., of the question stage selected for play this time. For example, even a score assigned to the same "desk A" varies depending on the theme of a question stage. Then, from among the furniture articles for which scores are set as described above, up to 12 furniture articles are selected in descending order of score in the question stage. Accordingly, even when the user possesses a large number of furniture articles, only furniture articles that are useful in the furniture selection game can be picked up and displayed in the furniture article list 202, so that time and effort for the user to select furniture articles can be reduced. Here, in the game, regarding the display order (arrangement order) of the respective furniture articles in the furniture article list 202, the furniture articles are not arranged and displayed in descending order of score. In the game, in principle, regardless of score, the furniture articles are arranged in a random order and displayed in the furniture article list 202. Moreover, regarding the random order, for example, the order may be random for each question stage, or the order for the same question stage may be a random order that is changed each time the game is played. Furthermore, other than such a random order, for example, the furniture articles may be displayed in an order of furniture articles acquired earlier. By not displaying the furniture articles in an order of score as described above, the fun of the user thinking which furniture article gives a higher score on their own can be provided. When the user possesses a plurality of furniture articles that are the same, all the furniture articles that are the same may be displayed. Moreover, the furniture article list 202 can be scrolled, and furniture articles that cannot be included in a single display of the furniture article list 202 can be displayed by performing a predetermined scrolling operation.

Regarding score setting for the furniture articles, score assignment is predefined in this example. However, in another exemplary embodiment, a score for each furniture article may be calculated on the basis of a predetermined calculation formula.

Here, regarding the display order, exceptions may be provided. For example, if the furniture articles possessed by the user include a "recommended furniture article", this furniture article is displayed at an initial display position (front position) of the furniture article list 202. In the example in FIG. 2, the initial display position (front position) is the upper left position of (the selection area 207 of) the furniture article list 202 (this furniture article is the furniture article displayed as "COUNTRY DESK" in the drawing). The "recommended furniture article" will be described. The "recommended furniture article" is a furniture article for which a highest score is set in the question stage. In addition, the "recommended furniture article" is defined so as to be associated with each arrangement area 203 in each of the question stages. In the exemplary embodiment, since the "room" having a theme of "country" is taken as an example, the "country desk" is predefined, for the arrangement area 203A, as a furniture article with which a highest score is acquired, that is, as a "recommended furniture article". In addition, a "country book shelf" is predefined as a "recommended furniture article" for the arrangement area 203B, and a "country chair" is predefined as a "recommended furniture article" for the arrangement area 203C. Then, if the user possesses these "recommended furniture articles", these furniture articles are displayed at the front position of the furniture article list 202. By displaying the "recommended furniture article" at the front as described above, time and effort for the user to perform a selection operation can be reduced. That is, time and effort for the user to perform a scrolling operation or the like on the furniture article list 202 to search for whether the user possesses a furniture article with which a highest score is acquired, can be saved.

Regarding presentation of the above "recommended furniture article", the "recommended furniture article" may be constantly displayed in connection with the furniture article list 202, regardless of whether the user possesses the "recommended furniture article". For example, an image showing the "recommended furniture article" corresponding to the arrangement area 203 that is targeted for operation at that time may be displayed at the left side of the question stage text displayed in the name area 206 in FIG. 2 described above. This image may be displayed regardless of whether the user possesses the "recommended furniture article". Accordingly, which furniture object gives a high score can be clearly shown to the user without necessarily displaying the "recommended furniture article" at the front. As a result, if the user possesses the clearly shown "recommended furniture article", the user does not have to be troubled with selecting a furniture article. Moreover, if the user does not own the "recommended furniture article", the desire to own this furniture article can be increased.

Furthermore, regarding presentation of the "recommended furniture article", at least before the user selects a furniture article, the "recommended furniture article" may be presented such that the "recommended furniture article" is recognizable by the user in advance. For example, the "recommended furniture article" corresponding to each question stage may be displayed in a screen for selecting a question stage.

Figure 4:
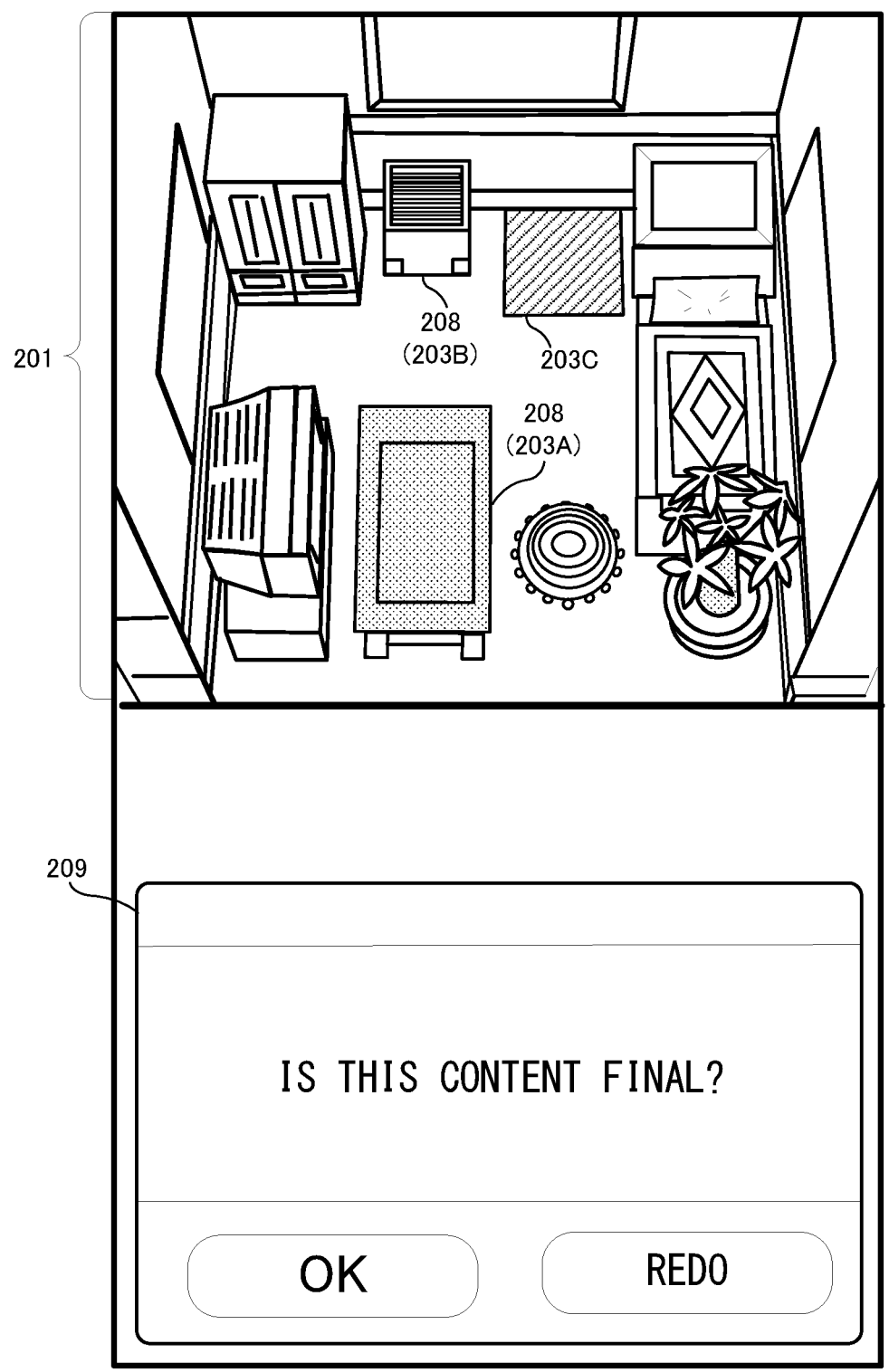
FIG. 4 illustrates a non-limiting example of a game image.

As described above, when arranging a furniture article in the arrangement area 203A is finished, the arrangement area 203B is automatically set as the next operation target, and the contents displayed in the furniture article list 202 are also changed to contents corresponding to the arrangement area 203B (here, furniture articles, the type of each of which is "shelf"). When arranging a furniture article in the arrangement area 203B through the same operation as described is finished, the arrangement area 203C is automatically set as the next operation target, and the contents displayed in the furniture article list 202 are also changed to contents corresponding to the arrangement area 203C (furniture articles, the type of each of which is "chair"). Then, when arranging a furniture article in the arrangement area 203B through the same operation as described is finished, an image for final confirmation of furniture arrangement is displayed. For example, an arrangement determination dialog 209 is displayed at substantially the lower half of the game image as shown in FIG. 4. Then, when the user performs an operation indicating OK on the arrangement determination dialog 209, the process regarding "scoring", which will be described next, is performed.

There may be the case where the number of possessed furniture articles is small and the user does not own any arrangeable furniture since, for example, the user has just started the game, or there may be the case where (even if the user possesses furniture articles) the user intentionally does not arrange any furniture article. For such a case, an option image showing "no arrangement" may be displayed in the furniture article list 202. When the user performs a tapping operation on the option image, no furniture article is arranged in the arrangement area 203 that is an arrangement target at that time, and the processing proceeds to a process for the next arrangement area 203. In the game image illustrated in FIG. 4 described above, a state where "no arrangement" is selected since the user does not own any arrangeable furniture article 208 for the arrangement area 203C is shown.

[Outline of Scoring Process]

Figure 5:
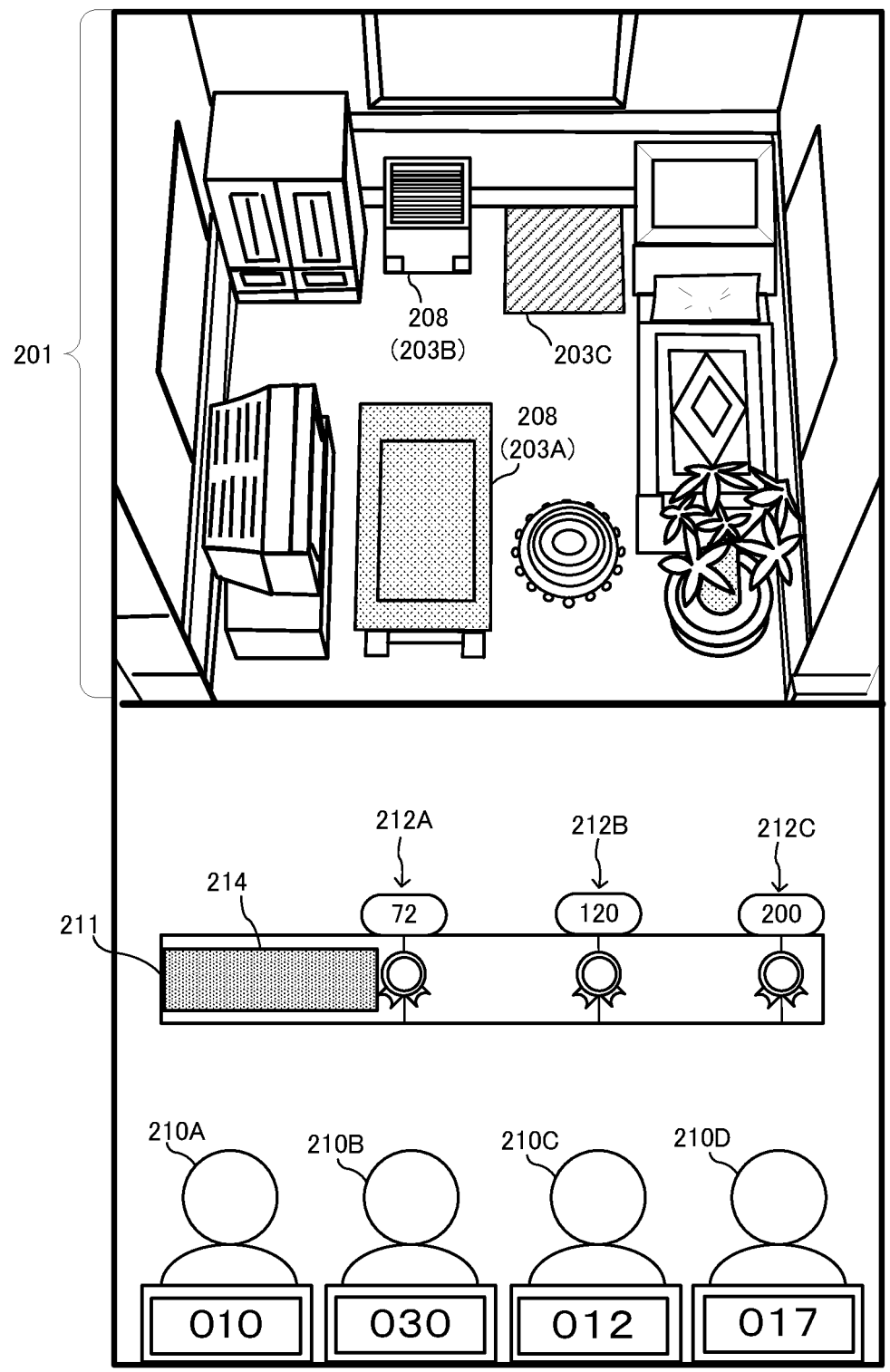
FIG. 5 illustrates a non-limiting example of a game image.

Next, the process regarding "scoring" will be described. When arranging furniture articles is finished and the processing proceeds to the process regarding scoring, as shown in FIG. 5, judge images 210A to 210D are displayed at a lower portion of the game image. In addition, a score panel is displayed at each judge image 210. That is, in the game, a representation in which four judges score (evaluate) the "room" is performed. Furthermore, a score meter 211 having a horizontally long shape is displayed above the judge images 210. Three pass lines 212, that is, a first pass line 212A, a second pass line 212B, and a third pass line 212C (hereinafter, sometimes collectively referred to simply as pass lines), are displayed in the score meter 211. Each pass line 212 also includes a specific score and an image showing a medal. Moreover, a user score bar 214 that is configured to extend from the left end of the score meter 211 is also displayed. As a representation of scoring, for example, when scoring is started, display is performed such that the value in the score panel of each judge image 210 is shuffled, and the user score bar 214 extends rightward. When the fluctuation of display of the score panel of each judge image 210 stops, the movement of the user score bar 214 also stops, and a score for the user is shown. By performing such display, a relationship between each pass line and an own score can be presented to the user. That is, it is possible to make the user recognize visually, for example, how close the own score is to a pass line, whether the own score is very close to a pass line, or how much the own score exceeds a pass line.

As a result of the scoring, if a user score that is a score acquired by the user exceeds any of scores defined as the pass lines, it is determined as a "pass". On the other hand, if the user score is less than the first pass line 212A, it is determined as a "fail". Thereafter, the processing proceeds to the process regarding "result display" for performing display regarding a scoring result as described later.

As a method for calculating a user score in the exemplary embodiment, a user score is calculated by the following method. Specifically, a user score is calculated by summing the scores that are set for furniture articles arranged in the respective arrangement areas 203. In another exemplary embodiment, a user score may be calculated by further combining another element in addition to the scores for the arranged furniture articles. For example, if the arranged furniture articles all have the same color, bonus points may be further added.

Here, a supplemental description of the pass lines 212 and a reward (medal) to be acquired will be given. As described above, the three pass lines 212A, 212B, and 212C are set in this example. Specifically, the first pass line 212A is set as "72 points", the second pass line 212B is set as "120 points", and the third pass line 212C is set as "200 points". That is, these pass lines 212 are set such that the degree of difficulty in achievement of the pass line 212 is increased stepwise. The user is given one medal each time one pass line 212 is reached. A medal is given only once for each pass line 212. Thus, the user can acquire up to three medals in one question stage. For example, when the user score is 100 points in the first play, one medal is given as a reward corresponding to the first pass line 212A. Thereafter, when the user score is 150 points in the second play, since the reward corresponding to the first pass line 212A has already been given, the medal corresponding to the first pass line 212A is not given, and one medal is given as a reward corresponding to the second pass line 212B. Thereafter, when the user score reaches, for example, 210 points in play of a certain number of times, the already given medals corresponding to the first pass line 212A and the second pass line 212B are not given, and one medal is given as a reward corresponding to the third pass line 212C. In other words, it can be considered that rewards corresponding to the three pass lines, respectively, are prepared. As described above, in the game, pass lines are set at three levels as conditions for the user to acquire rewards, that is, conditions to be achieved. Since the achievement conditions are set stepwise as described above, a guideline of play such as achieving a small goal and then achieving a large goal is provided to the user, thereby providing motivation to play the same question stage many times.

In the game, when the first pass line 212A is exceeded, the next question stage is unlocked. Unlocking a stage as described above is one reward in the exemplary embodiment.

In this example, pass lines are set at three levels. However, in another exemplary embodiment, the number of pass lines may be larger or smaller.

In the example of the game, as examples of the rewards, the medal is given as a reward for achieving a pass line, and the next question stage is unlocked as a reward corresponding to achievement of the first pass line 212A. The contents of the rewards are not limited to an increase in items in the game and removal of elements that have prevented the game from proceeding such as stage unlocking. For example, predetermined game currency may be given as a reward, or an increase in a parameter such as a maximum value of stamina of the user character may be a reward. In addition, for example, making it possible to use a game element that cannot be used so far, such as the user character acquiring a new skill or a new magic, may be a reward.

[Outline of Process of Result Display]

Figure 6:
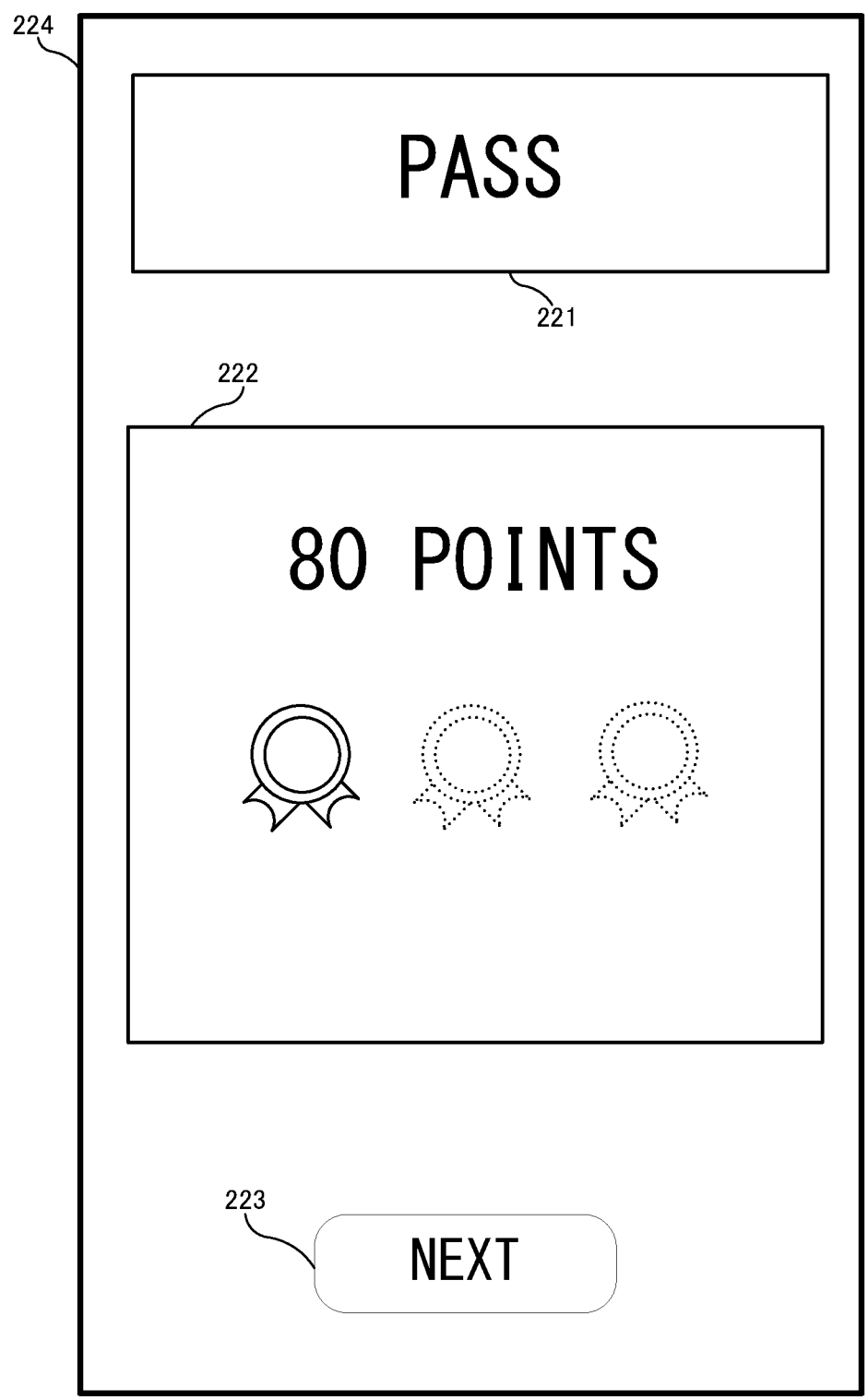
FIG. 6 illustrates a non-limiting example of a game image.

Next, a process regarding display of a scoring result, that is, regarding display of a game image showing pass/fail will be described. FIG. 6 illustrates an example of a game image when a result of scoring is a "pass". This is an example in which only the first pass line 212A is exceeded in the example in FIG. 5. In this case, a game image that includes an image 221 showing a pass, an image 222 showing the score acquired in this play and any medal acquired in this play, and a "next" button 223, is displayed as a scoring result image 224 (when any medal has already been acquired, an image showing the already acquired medal is displayed). When the user performs a tapping operation on the "next" button 223, the game image transitions. The behavior of the subsequent transition differs depending on whether the user score is less than the third pass line 212C. Specifically, if the user score is equal to or higher than the third pass line 212C, a game image (not shown) showing a question stage list for selecting a question stage is displayed. Thus, the user can subsequently challenge the next question stage.

Figure 7:
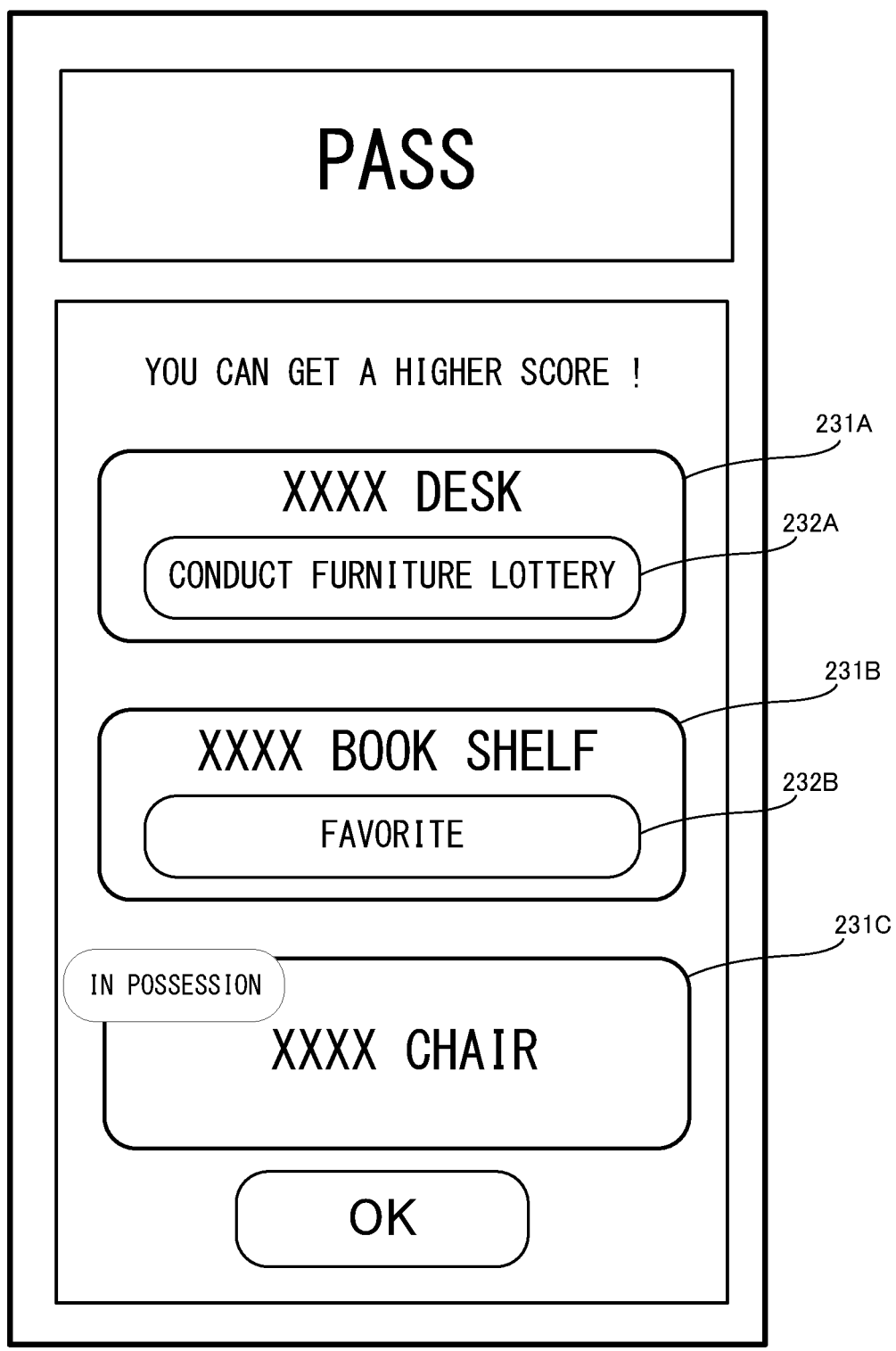
FIG. 7 illustrates a non-limiting example of a game image.

Meanwhile, if the user score is less than the third pass line 212C, when the user performs a tapping operation on the "next" button 223, a game image is displayed as shown in FIG. 7. The game image in FIG. 7 is an image that shows the user that a higher score can be acquired and also shows the user a furniture article that is effective for acquiring a higher score. In other words, the game image in FIG. 7 can be considered as an image for showing the user a proposal for acquiring a higher score. Here, to acquire a higher score, using a furniture article having a higher score than the furniture article used in this play is basically considered. Meanwhile, the "recommended furniture article" is set in the game as described above. Thus, using the "recommended furniture article" can be considered as a shortcut to clearing the question stage. Therefore, in the game image, an image showing the "recommended furniture article" set so as to correspond to the question stage and an image that serves as a guideline for acquiring the "recommended furniture article" are displayed on the assumption of the case where the user does not own the "recommended furniture article". In the example in FIG. 7, images 231A to 231C respectively showing three types of "recommended furniture articles" corresponding to the question stage are displayed. In addition, guideline buttons 232A and 232B are also displayed in the images 231A and 231B. The "guideline buttons" are each a button for calling a function to promote the user to acquire a furniture article. Here, the "recommended furniture article" corresponding to the image 231A can be acquired only by the above lottery process. In addition, the "recommended furniture article" corresponding to the image 231B can be acquired by the above-described "production". In the example in FIG. 7, when the user performs a tapping operation on the guideline button 232A, transition to a game image for performing the above lottery process is made. For example, a game image for acquiring a furniture article by the lottery process is displayed. Accordingly, for example, through a single tapping operation, the user can cause a state where it is possible to perform the lottery process for the "recommended furniture article". The image for acquiring a furniture article by the above lottery process may be directly displayed without transition of the screen. For example, a predetermined object for performing the lottery process may be displayed so as to be superimposed on the game image shown in FIG. 7.

In the example in FIG. 7, when the user performs a guideline button 232B in the example in FIG. 7, the "recommended furniture article" corresponding to the image 231B is automatically registered in a "favorites list". Here, the "favorites list" is a list in which furniture articles that are desired to be produced by the user are registered. That is, the "favorites list" is a list for the user to easily find a furniture article that is (to be) produced. When the list is displayed, the user easily recognizes which furniture article is to be produced by the user, so that the convenience of the user when producing a furniture article is enhanced.

As described above, by displaying a game image showing the user a proposal for acquiring a higher score as in FIG. 7, it is shown that there is a possibility of being able to acquire a higher score, and the "recommended furniture article" is introduced as a means for acquiring a high score, and the convenience of the user is enhanced by also presenting a guideline for acquiring the "recommended furniture article".

In the example in FIG. 7, the "recommended furniture article" corresponding to the image 231C is already possessed by the user. Thus, although a guideline button 232 as described above is not displayed in the image 231C, if the user does not own the "recommended furniture article", a guideline button 232C is displayed similar to the above.

In another exemplary embodiment, the furniture article displayed in this screen is not limited to the "recommended furniture article", and a predetermined furniture article for which a score higher than that for the furniture article used in this play is set may be presented.

Figure 8:
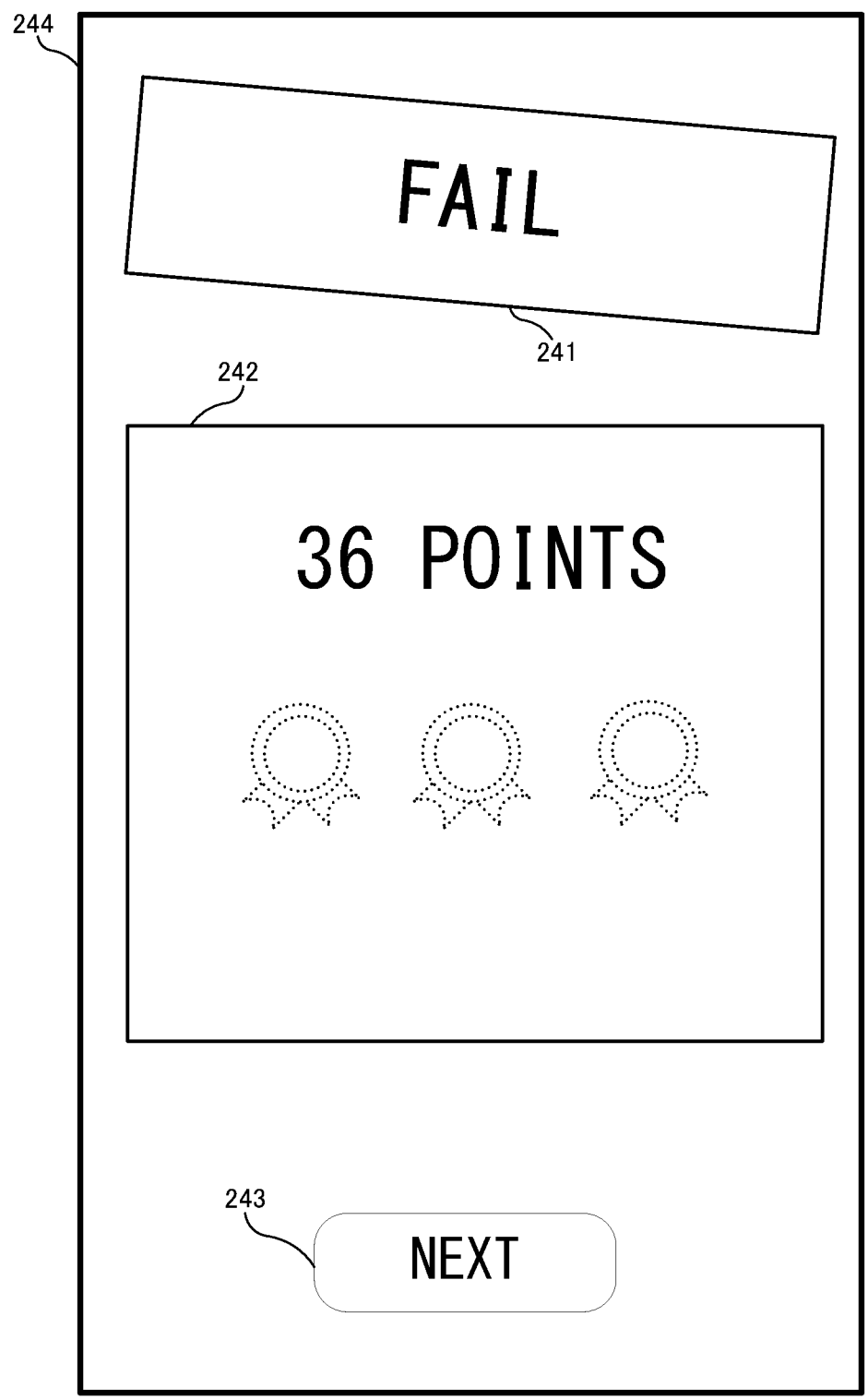
FIG. 8 illustrates a non-limiting example of a game image.
Figure 9:
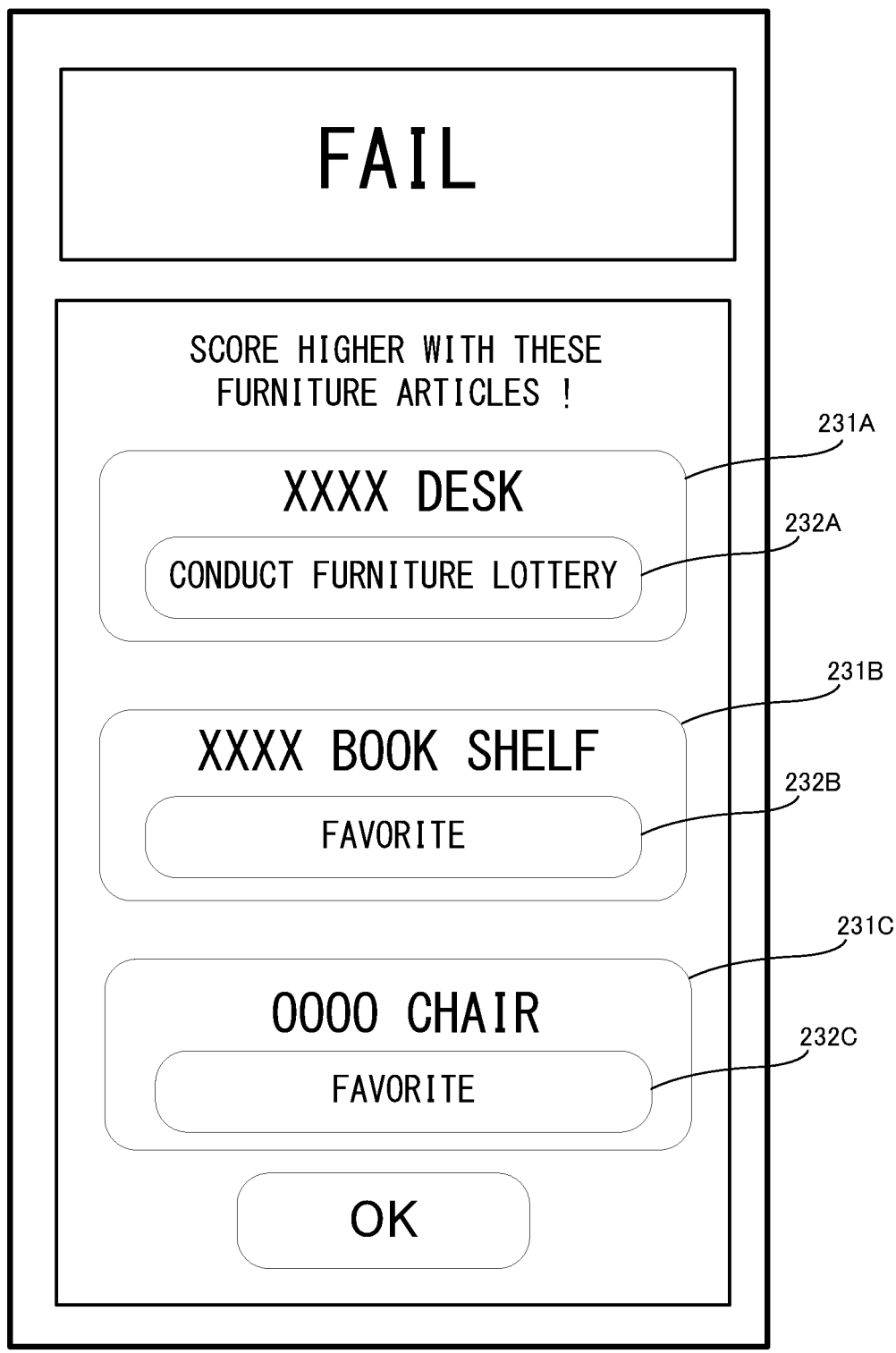
FIG. 9 illustrates a non-limiting example of a game image.

Next, the case where a result of scoring is a "fail" will be described. FIG. 8 illustrates an example of a game image displayed in such a case. In FIG. 8, a game image that includes an image 241 showing a fail, an image 242 showing the score acquired in this play and any medal acquired, and a "next" button 243, is displayed as a scoring result image 244. When the user performs a tapping operation on the "next" button 243, a game image is displayed as shown in FIG. 9. Here, regarding the displayed contents, contents that are the same as in the game image showing the "recommended furniture article" and the guideline as a means for acquiring the "recommended furniture article" as described above with reference to FIG. 7, except for display of pass/fail, can be basically displayed. Thus, the detailed description of the game image is omitted. If the result is a fail, this screen is displayed.

[Advice Function]

Meanwhile, in the furniture selection game according to the exemplary embodiment, an "advice function" that can be performed only in a situation where the user score is only a little short of any pass line 212 as a result of the scoring, is prepared. When this function is used, control is performed such that the user score is caused to reach at least the pass line 212 which the user score is only a little short of. Hereinafter, the "advice function" will be described.

Figure 10:
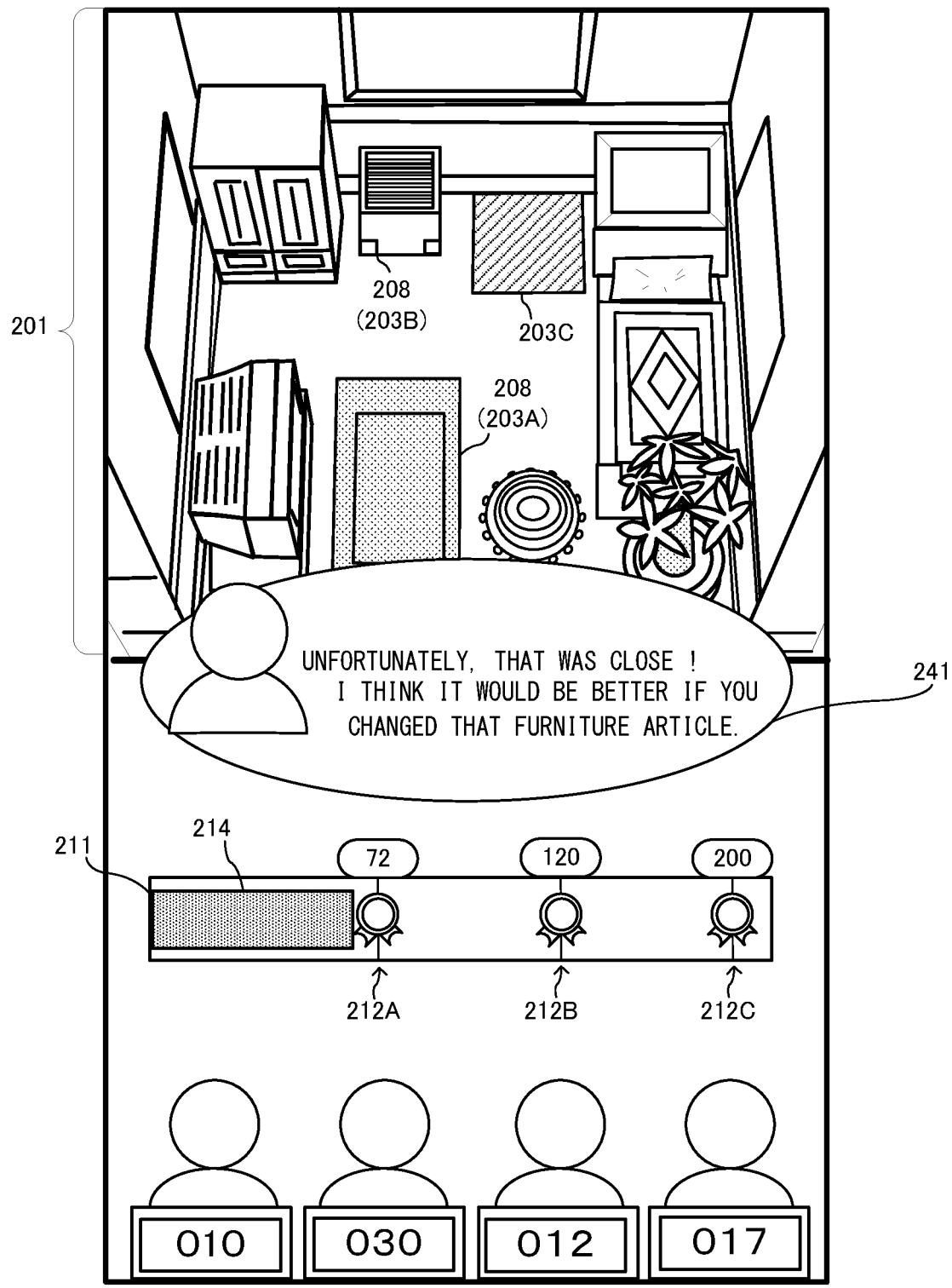
FIG. 10 illustrates a non-limiting example of a game image.
Figure 11:
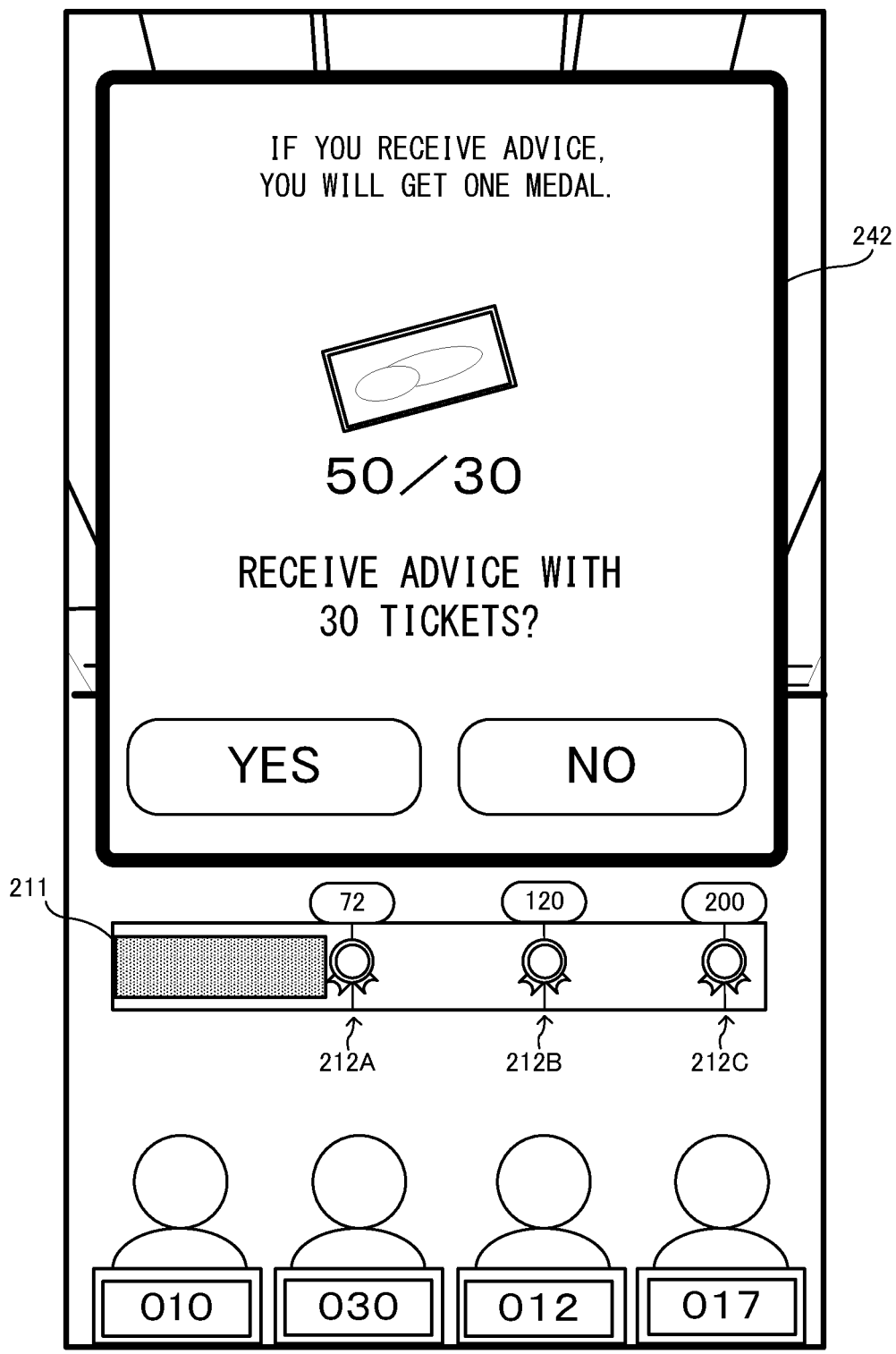
FIG. 11 illustrates a non-limiting example of a game image.

FIG. 10 illustrates an example of a game image in a situation where the user score is only a little short of the first pass line 212A as a result of scoring. To determine a situation of being "a little short", an "advice line" is preset so as to correspond to each pass line in this example. The "advice line" will be described in detail later. In the example in FIG. 10, the case where the user score is 69 points and the first pass line 212A is 72 points is shown. In such a case, an image 241 showing that a judge is making a comment is displayed at substantially the center of the game image as shown in FIG. 10. The image 241 is an image showing that it is possible for the user to receive advice from a judge. After the image 241 is displayed, for example, when the user performs a tapping operation at a predetermined position, a game image is displayed as shown in FIG. 11. In the game image in FIG. 11, an advice confirmation dialog 242 for asking the user whether to receive advice from a judge is displayed. In the game, it is possible to receive advice by consuming a predetermined amount of in-game virtual currency called "tickets". In other words, the advice function can be performed in exchange for a change in the number of "tickets" possessed.

Here, a supplemental description of the "tickets" will be given. The tickets are a kind of virtual currency that can be obtained by settlement processing using real-world currency, so-called billing. That is, the tickets are virtual currency given to the user in accordance with a billing amount. In addition, the "tickets" can be acquired, for example, by a quest reward, a reward for clearing a stage for the first time, or the like, in addition to by the above-described billing.

Figure 12:
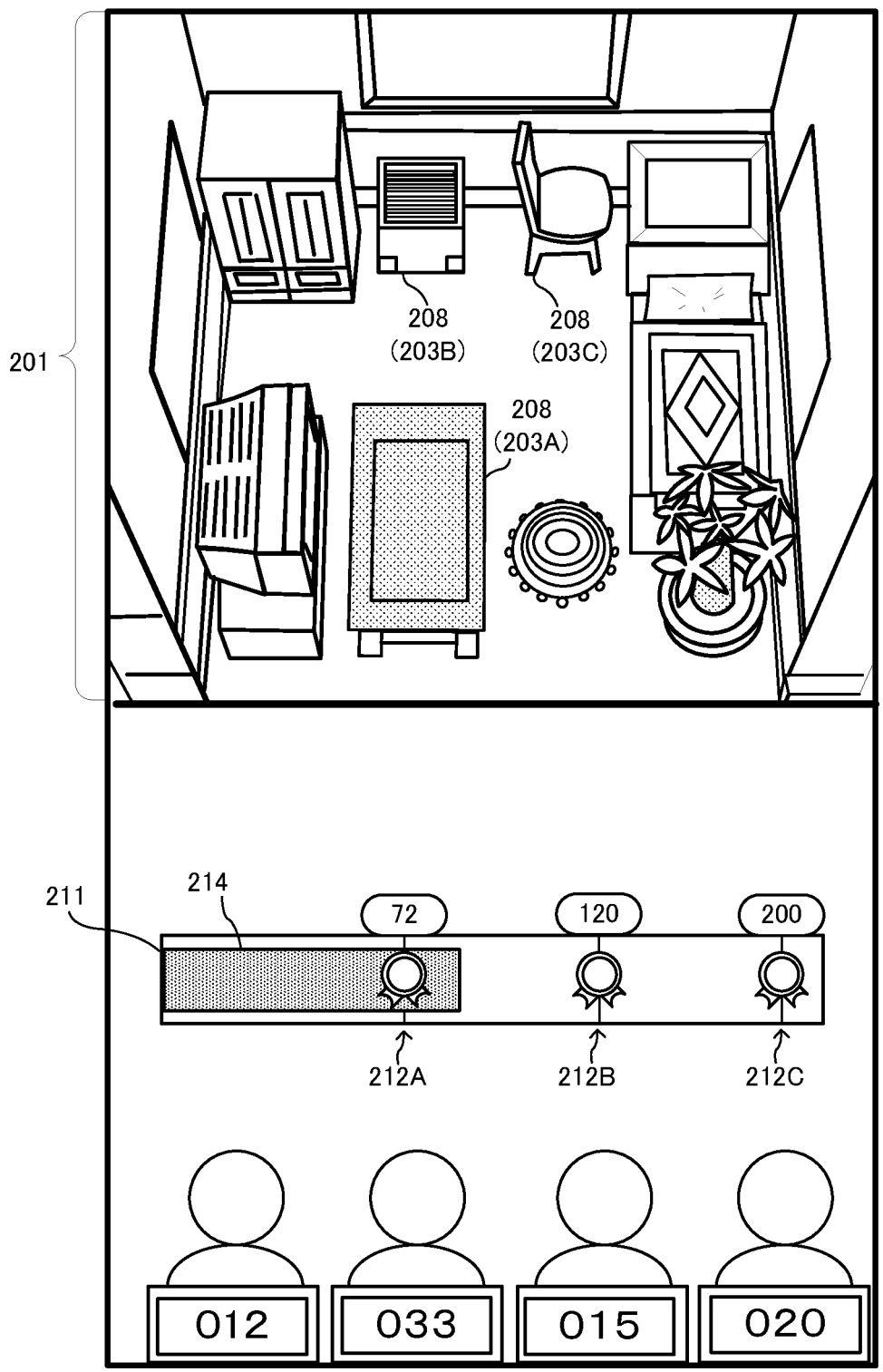
FIG. 12 illustrates a non-limiting example of a game image.

Next, the case where the user selects receiving advice in the advice confirmation dialog 242 in FIG. 11 described above, that is, the case where the user selects performing the advice function, will be described. In the case where the user selects receiving advice, a process of arranging the "recommended furniture article" is performed in this example. Specifically, a process of replacing an arranged furniture article with the "recommended furniture article", or a process of newly arranging the "recommended furniture article" in the arrangement area 203 in which no furniture article has been arranged, is performed ("arrangement" of a furniture article in the following description means both new arrangement and replacement). The arrangement of the "recommended furniture article" is performed even when the user possesses or does not own the recommended furniture article. That is, the arrangement of the "recommended furniture article" is performed regardless of whether the user possesses the recommended furniture article. More specifically, if there is an arrangement area 203 in which no furniture article has been arranged, a representation in which the "recommended furniture article" corresponding to this arrangement area is arranged is displayed. In addition, if furniture articles have been arranged in all the arrangement areas, a representation in which a furniture article having a lowest score among the already arranged furniture articles is replaced with the "recommended furniture article" corresponding to the arrangement area 203 is displayed. FIG. 12 illustrates an example of a game image as a result of receiving advice. In FIG. 12, a furniture article object 208 that is a "chair" and is also a "recommended furniture article" is arranged in the arrangement area 203C in which no furniture article has been arranged before the advice. After arrangement of or replacement with the "recommended furniture article" is performed upon receiving the advice as described above, the user score is recalculated. As a result, a representation in which the user score exceeds the first pass line 212A is displayed in the example in FIG. 12, and the processing then proceeds to display of a result screen for the time of "pass" as described above.

Here, in the "advice function", in the case where the user score is a little short of any pass line 212 as described above, the furniture arrangement state is changed such that the user score becomes at least equal to or higher than the next pass line 212. Thus, a plurality of furniture articles may be changed depending on the score. That is, if the user score still has not reached the pass line 212 when only arrangement in the arrangement area 203 at one location is changed, arrangement of the "recommended furniture article" can further occur for the arrangement area 203 at another location. In other words, arrangement of the "recommended furniture article" can occur a plurality of times until the user score reaches any pass line 212.

In this example, control is performed by the advice function such that at least the next pass line can be achieved. Thus, for example, if the advice function is used when the user score is a little short of the first pass line 212A, arrangement of the "recommended furniture article" is performed such that at least the first pass line 212A can be achieved. In addition, depending on the score set for the furniture article, not only the first pass line 212A but also the second pass line 212B can be simultaneously achieved.

In another exemplary embodiment, the pass line 212 to be achieved by the advice function may be the closest pass line 212 only. For example, if the advice function is used when the user score is a little short of the first pass line 212A, control (selection of a furniture article to be arranged) may be performed such that the first pass line 212A can be achieved but a score that cannot achieve the second pass line 212B and the third pass line 212C is acquired. That is, control may be performed on the basis of the user score at that time such that a higher score is acquired but only the closest pass line 212 is achieved.

Figure 13:
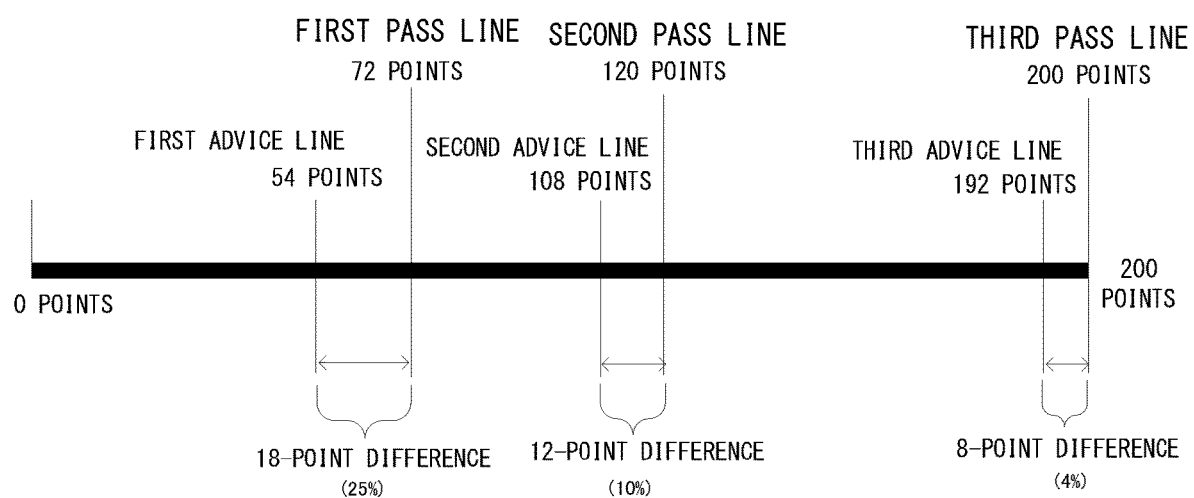
FIG. 13 is a schematic diagram illustrating a non-limiting example of a relationship between pass lines and advice lines.

Next, the "advice line" will be described. As described above, the advice line is used for determining a situation of being "a little short". In other words, the advice line is an element indicating a condition or a threshold for determining whether it is possible to perform the "advice function". FIG. 13 shows a schematic diagram illustrating a relationship between pass lines and advice lines. FIG. 13 shows the positioning of the above first to third pass lines in the case where the left end of a horizontal axis is defined as 0 points and the right end of the horizontal axis is defined as 200 points. In addition, FIG. 13 also shows the positioning of a first advice line, a second advice line, and a third advice line that are set so as to correspond to the respective pass lines. In other words, it can be considered that the first pass line and the first advice line are configured as a pair, the second pass line and the second advice line are configured as another pair, and the third pass line and the third advice line are configured as still another pair.

In this example, each advice line is calculated and set as described below. Specifically, the first advice line is set as a score that is less than the score of the first pass line by 25%, the second advice line is set as a score that is less than the score of the second pass line by 10%, and the third advice line is set as a score that is less than the score of the third pass line by 4%. In this example, the first pass line is "72 points", and thus "54 points" which is equal to 72 points—25% is set as the first advice line. In addition, the second pass line is "120 points", and thus "108 points" which is equal to 120 points—10% is set as the second advice line. Moreover, the third pass line is "200 points", and thus "192 points" which is equal to 200 points −4% is set as the third advice line. The score setting is merely an example. It is needless to say that, in another exemplary embodiment, score setting other than this example may be made as long as the above-described purpose as the advice lines can be achieved.

Here, in the case of the above score setting, for example, if the user score is within the range of equal to or higher than the first advice line and less than the first pass line, the advice function for achieving the first pass line can be performed. In addition, if the user score is equal to or higher than the first pass line, the advice function for achieving the first pass line is not performed. In other words, the condition of the first advice line paired with the first pass line can be considered as a condition that cannot be achieved simultaneously with the condition of the first pass line and has an exclusive relationship with the condition of the first pass line. Depending on the score setting, a pass line and an advice line that belong to pairs different from each other may be simultaneously achieved. As one example, in the example in FIG. 13, the first pass line and the first advice line are configured as a first pair, the second pass line and the second advice line are configured as a second pair, and the third pass line and the third advice line are configured as a third pair. In this case, if the user score is 110 points, the first pass line belonging to the first pair is achieved, and at the same time, the second advice line belonging to the second pair is achieved.

Here, when attention is paid to the difference between each pass line and the corresponding advice line, the difference between a pass line having a higher degree of difficulty in achievement thereof and the corresponding advice line is smaller than the difference between a pass line having a lower degree of difficulty in achievement thereof and the corresponding advice line. That is, whereas the difference between the first pass line having a lower degree of difficulty and the first advice line is 18 points, the difference between the second pass line having a higher degree of difficulty than the first pass line and the second advice line is 12 points. In addition, the difference between the third pass line having a further higher degree of difficulty in achievement thereof and the third advice line is 8 points. As described above, as the condition of the advice line, a condition that an advice line is closer to a pass line having a higher degree of difficulty in achievement thereof is set. That is, the advice line is not set at the same proportion under the same condition for each pass line, and the condition is changed in accordance with the degree of difficulty in achievement of the pass line. Accordingly, for example, regarding the first achievement condition (first pass line), a loose condition for receiving advice is set, whereby it is possible to provide a sense of accomplishment of a pass to beginners of the game or users inexperienced in the game.

In the method for calculating and setting the advice line, a proportion to the pass line is used in the above example, but the calculating and setting method is not limited thereto. Any method may be used as long as setting is made such that, as the degree of difficulty in achievement of a pass line becomes higher, the difference between the pass line and the corresponding advice line becomes smaller.

In another exemplary embodiment, without making the difference between a pass line and the corresponding advice line smaller as the degree of difficulty in achievement of the pass line becomes higher, setting may be made with the same proportion or the like for each pass line. In addition, conversely, setting may be made such that, as the degree of difficulty in achievement of a pass line becomes lower, the difference between the pass line and the corresponding advice line becomes smaller.

In the exemplary embodiment, the value that is set for the advice line is not presented to the user. This is because, if the value for the advice line is clearly shown, the user plays the game from the beginning while aiming for the advice line, and the original fun of the furniture selection game is impaired. In addition, the score of each furniture article is not presented to the user. Accordingly, the fun of selecting an possessed furniture article can be moderately provided to the user. Regarding the pass lines, the pass lines are presented to the user by displaying the pass lines in the screen during scoring in this example. However, in another exemplary embodiment, the pass lines do not have to be presented to the user.

When the same question stage is repeatedly played, an already achieved pass line and the corresponding advice line are not taken into consideration.

As described above, in the game, the user can use the advice function in the case of being a little short of a pass line. Then, the user can perform the advice function in exchange for consumption of the "tickets". When the advice function is performed, furniture arrangement is performed such that at least the closest pass line is exceeded as described above. As a result, at least the closest pass line can be exceeded, and the user can acquire a reward (an in-game effect) corresponding to the pass line. That is, in a situation where the user score is a little short of an achievement condition such as the pass line as a result of scoring or the like, the achievement condition is satisfied in exchange for a decrease in the number of tickets. Accordingly, on the condition that the "tickets" are consumed, the user can omit time and effort taken to reach the pass line. That is, the user can omit time and effort taken to collect a furniture article required for achieving the pass line ("production" of a furniture article, a lottery, etc.), or can omit time and effort to rearrange furniture articles. That is, the user can omit time and effort to start over from the beginning. In addition, on the other hand, an option of starting over without receiving advice is prepared. As a result, for example, the user collects furniture articles on their own, and thus it is possible to provide the fun originally assumed in the game, to the user. In addition, since a pass can be achieved as a result of re-challenging the game, a stronger sense of accomplishment such as "reaching a pass line on their own" can be provided to the user. As described above, options corresponding to a wish of the user and the situation of the user can be provided, and the user can select whichever one the user prefers, so that the original fun of the game can be prevented from being impaired.

In the game, the setting of the advice line assumes the situation of "being a little short" of a pass line as described above. Thus, the difference between the advice line and the pass line is preferably small to some extent. As an example, the advice line is set as a score that is equal to or higher than 50% of the pass line. This is because, if the advice line is excessively lowered, the advice confirmation dialog 242 is frequently displayed, and thus the user may be made to feel annoyed. In addition, when receiving advice, the user is caused to provide a so-called compensation such as consumption of "tickets" in the game. Meanwhile, the game also has an aspect of allowing the user to enjoy a collection element of collecting furniture articles. In this regard, if a pass can be achieved by merely paying a compensation each time the user fails, the fun of furniture collection may be impaired. Therefore, by setting the advice line such that the advice line is close to a pass line to some extent as described above, the convenience of the user is also enhanced in terms of time savings as described above, etc., without impairing the fun of furniture collection more than necessary.

[Details of Game Processing of Exemplary Embodiment]

Next, furniture selection game processing according to the exemplary embodiment will be described in more detail with reference to FIGS. 14 to 25.

[Data to be Used]

Figure 14:
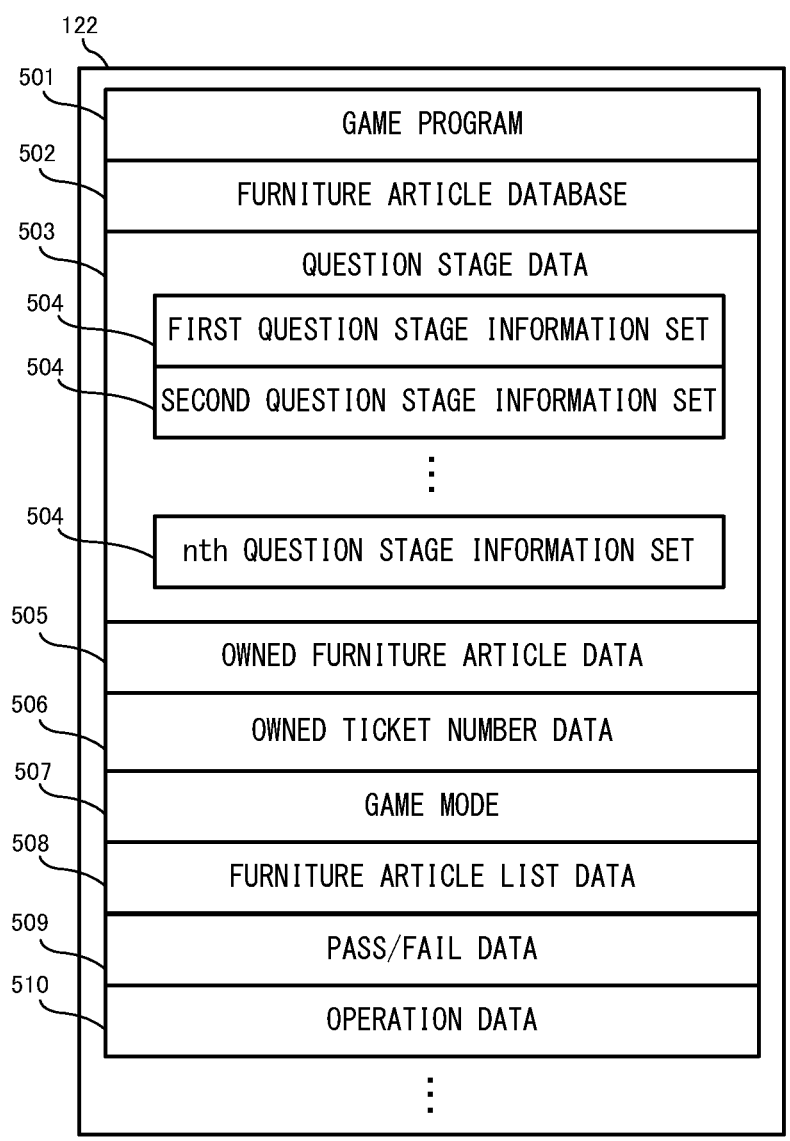
FIG. 14 illustrates a non-limiting example of data stored in a memory 122.

First, various kinds of data to be used in the game processing will be described. FIG. 14 is a memory map showing an example of various kinds of data stored in the memory 122 of the information processing terminal 102. A game program 501, a furniture article database 502, question stage data 503, possessed furniture article data 505, possessed ticket number data 506, a game mode 507, furniture article list data 508, pass/fail data 509, operation data 510, etc., are stored in the memory 122 of the information processing terminal 102.

The game program 501 is a program for performing the game processing according to the exemplary embodiment.

Figures 15, 16:
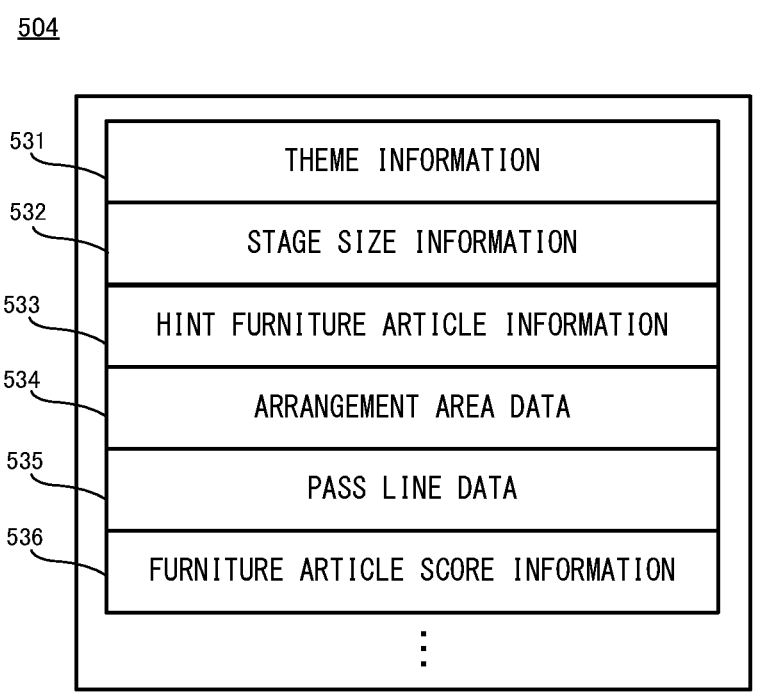
FIG. 15 illustrates a non-limiting example of the data structure of a furniture article database 502.
FIG. 16 illustrates a non-limiting example of the data structure of an nth question stage information set 504.

The furniture article database 502 is data defined for the above-described "furniture articles". FIG. 15 is a diagram illustrating an example of the data structure of the furniture article database 502. The furniture article database 502 includes a furniture article ID 521, furniture article type information 522, a suited theme 523, a name 524, model data 526, etc. The furniture article ID 521 is an identifier for uniquely identifying a furniture article. The furniture article type information 522 is information for indicating the "type" of the furniture article. The suited theme 523 is information that defines a "theme" to which the furniture article is suited. One furniture article may be associated with a plurality of suited themes. The name 524 is text data indicating the name of the furniture article. The model data 526 is data indicating a polygon model of the furniture article, and also includes texture data indicating the appearance of the furniture article, etc.

Referring back to FIG. 14, the question stage data 503 is data that defines the above question stages. The question stage data 503 includes an nth question stage information set (n is an integer starting from 1) 504 corresponding to each of a plurality of question stages. FIG. 16 illustrates an example of the data structure of the nth question stage information set 504. The nth question stage information set 504 includes theme information 531, stage size information 532, hint furniture article information 533, arrangement area data 534, pass line data 535, and furniture article score information 536. In addition, although not shown, the nth question stage information set 504 also includes stage name information, various kinds of information (information about recommended furniture articles, etc.) to be presented to the user as the above stage information when play is started, achievement information indicating which of a plurality of pass lines described later has been achieved, BGM data, etc.

The theme information 531 is information indicating the "theme" set for the question stage. The stage size information 532 is data that defines the size, the shape, etc., of the question stage within a virtual space. For example, the size in three axis directions, etc., in a three-dimensional virtual space such as the above "room" are defined. The hint furniture article information 533 is information about the above-described hint furniture article, and includes information that identifies the hint furniture article to be arranged in the question stage, information indicating the position at which the hint furniture article is arranged, etc.

The arrangement area data 534 is data that defines the arrangement areas 203 in the question stage. FIG. 17 illustrates an example of the data structure of the arrangement area data 534. The arrangement area data 534 is data in a table format including the following items: operation order information 541, area position information 542, corresponding furniture article type information 543, and recommended furniture article information 544. The operation order information 541 is information that defines an operation order of the arrangement area 203. The area position information 542 is information that defines the position at which each arrangement area 203 is set in the question stage. The corresponding furniture article type information 543 is information that defines the type of furniture articles associated with each arrangement area 203 (the type of furniture articles that can be arranged in the arrangement area). The recommended furniture article information 544 is information for identifying the "recommended furniture article" associated with each arrangement area 203. Here, a predetermined furniture article ID 521 is set as appropriate as information that identifies the "recommended furniture article".

Referring back to FIG. 16, the pass line data 535 is information that defines the pass lines and the advice lines as described above. FIG. 18 illustrates an example of the data structure of the pass line data 535. The pass line data 535 is data in a table format including the following items: a pass line numeral 551, pass score information 552, and advice line information 553. The pass line numeral 551 is information for uniquely identifying each pass line. The pass score information 552 is a score that is set for the pass line. If the user score is equal to or higher than the set score, it is determined that the pass line is achieved. The advice line information 553 defines a score of the advice line corresponding to the pass line. If the user score is equal to or higher than the score of the advice line information 553 and less than the score of the pass score information 552, it is determined that the present state is a state where it is possible to use the advice function for the pass line. The number of pass lines may be different for each question stage. Thus, the number of records (the number of information sets each of which corresponds to one row in FIG. 18) included in the pass line data 535 is different depending on the question stage.

In this example, each advice line is predefined by the advice line information 553. However, in another exemplary embodiment, only a calculation formula for each advice line may be predefined, and, for example, advice lines may be calculated each time a question stage is started.

The furniture article score information 536 is information that defines a score for each furniture article in the question stage. For example, the furniture article score information 536 includes the furniture article ID 521 and information indicating the score for a furniture article identified by the furniture article ID 521, in the question stage.

Referring back to FIG. 14, the possessed furniture article data 505 is data for indicating the furniture articles possessed by the user. For example, the possessed furniture article data 505 includes the furniture article IDs 521 corresponding to the furniture articles possessed by the user.

The possessed ticket number data 506 is data indicating the number of the "tickets" possessed by the user.

The game mode 507 is information for indicating the present progress state of the game in processing in a later-described flowchart. That is, the game mode 507 is information for indicating whether a process regarding furniture arrangement is being performed, a process regarding scoring is being performed, or a process regarding display of a result screen is being performed. In this example, information indicating any one of "furniture arrangement", "scoring", and "result display" is set in accordance with the game processing.

Figure 19:
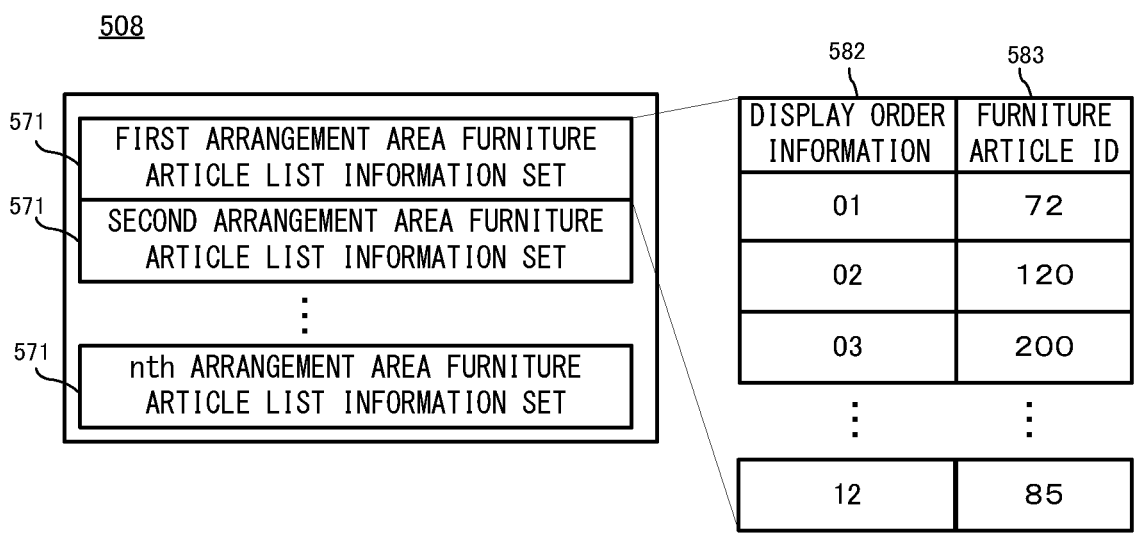
FIG. 19 illustrates a non-limiting example of the data structure of furniture article list data 508.

The furniture article list data 508 is data for displaying the above-described furniture article list 202. The furniture article list data 508 is temporary data that is generated on the basis of the contents of the question stage and the possessed furniture article data 505, for example, when play of the question stage is started. FIG. 19 illustrates an example of the data structure of the furniture article list data 508. In FIG. 19, the furniture article list data 508 can include a plurality of nth arrangement area furniture article list information sets 571 (n is an integer). The nth arrangement area furniture article list information sets 571 are generated so as to be associated with the respective arrangement areas 203 that are set for a question stage to be played. In addition, the number of the nth arrangement area furniture article list information sets 571 is increased/decreased in accordance with the number of the arrangement areas 203 that are set for the question stage to be played. In the case of playing a question stage with three arrangement areas 203 as shown in FIG. 2 described above, the number of the nth arrangement area furniture article list information sets 571 is three.

Each nth arrangement area furniture article list information set 571 is data in a table format including the following items: display order information 582 and a furniture article ID 583. The display order information 582 is information that defines a position at which an image of the furniture article is to be displayed in the furniture article list 202 (which position, starting from the first, the image is to be displayed). In this example, since the maximum number of furniture articles included in the furniture article list 202 is 12, any of integers from 1 to 12 is set as the display order information 582. The furniture article ID 583 is information for identifying the furniture article, and information corresponding to the furniture article ID 521 of the furniture article database 502 is defined.

Figure 20:
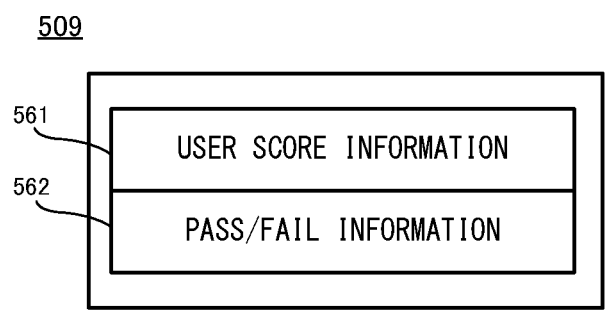
FIG. 20 illustrates a non-limiting example of the data structure of pass/fail data 509.

Referring back to FIG. 14, the pass/fail data 509 is data indicating a result of the scoring. FIG. 20 illustrates an example of the data structure of the pass/fail data 509. The pass/fail data 509 includes user score information 561 and pass/fail information 562. The user score information 561 is information indicating the user score. The pass/fail information 562 is information whether a result of the scoring is a pass or a fail.

Referring back to FIG. 14, the operation data 510 is data generated on the basis of a signal outputted from the operation section 123, and is information indicating the content of an operation performed by the user on the operation section 123.

In addition, various kinds of working data to be used in this processing, etc., are also stored as appropriate in the memory 122.

[Details of Processing Performed by Processor 121]

Next, the furniture selection game processing according to the exemplary embodiment will be described in detail with reference to flowcharts in FIGS. 21 to 25. Here, the above-described processes regarding furniture arrangement, scoring, and result display will be mainly described, and the description of other game processing is omitted. The flowcharts are merely an example of the processing. Therefore, the order of each process step may be changed as long as the same result is obtained. In addition, the values of variables and thresholds used in determination steps are also merely examples, and other values may be used as necessary.

Figure 21:
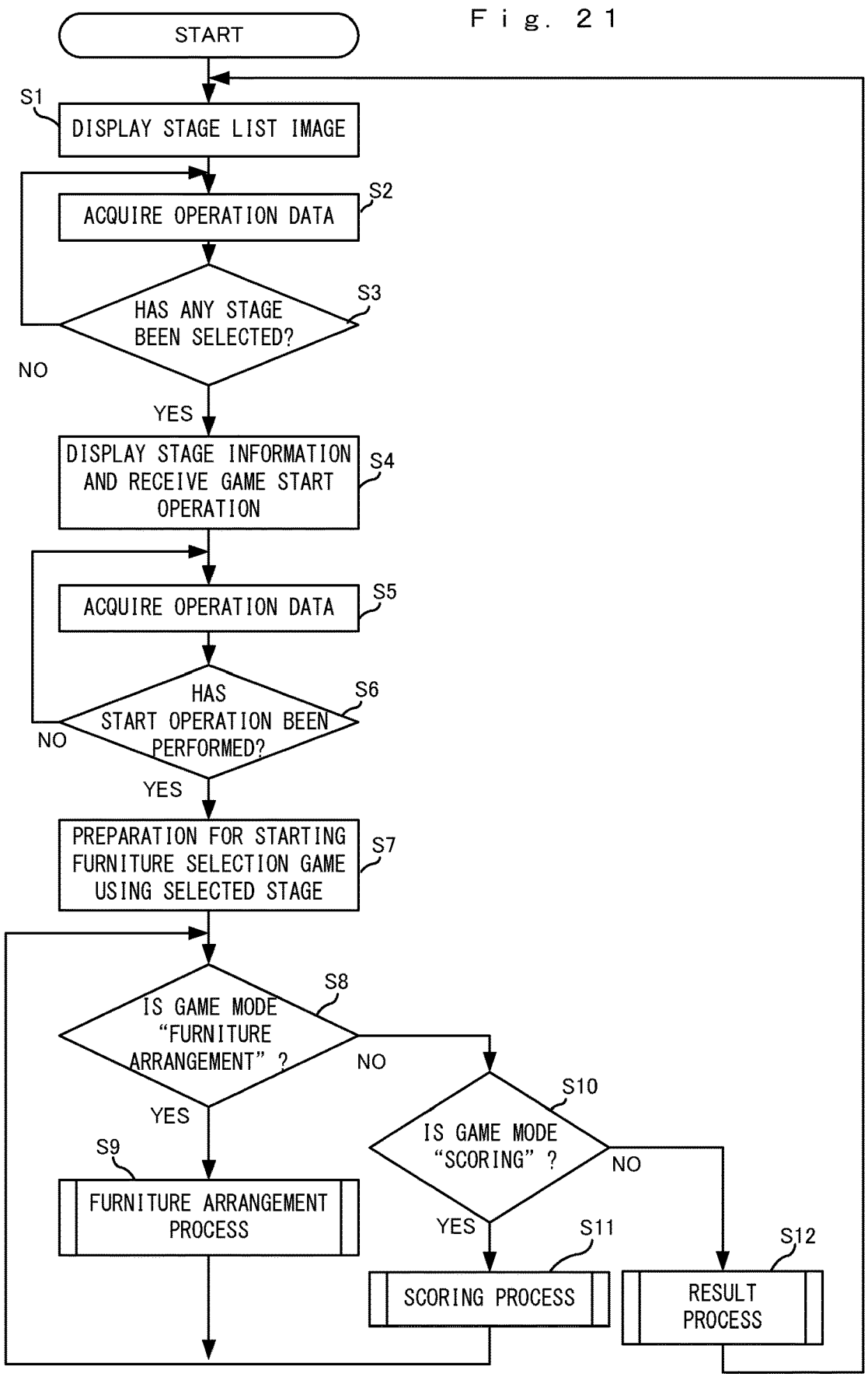
FIG. 21 is a flowchart showing a non-limiting example of a furniture selection game processing in detail.

FIG. 21 is a flowchart showing the furniture selection game processing according to the exemplary embodiment in detail. Execution of this processing is started, for example, from a screen of a "square" area provided in the game, when the user performs a tapping operation on a building object showing that the furniture selection game can be played.

[Stage Selection to Start of Furniture Selection Game]

First, the processor 121 performs a process for causing the user to select a question stage to be played. Specifically, in step S1, the processor 121 generates a game image (not shown) showing a list of question stages, and displays the list on the display section 124. Then, the processor 121 receives an operation from the user.

Next, in step S2, the processor 121 acquires the operation data 510. Furthermore, in step S3, the processor 121 determines whether any question stage has been selected, on the basis of the operation data 510. As a result of the determination, if question stage has been selected (NO in step S3), the processor 121 returns to step S2 and repeats the process.

Meanwhile, if any question stage has been selected (YES in step S3), in step S4, the processor 121 generates a game image showing information about the selected question stage and displays the game image on the display section 124. Then, the processor 121 receives a game start operation from the user. Here, the displayed game image may include information indicating the "recommended furniture article" corresponding to the question stage. Accordingly, the user can recognize in advance a furniture article that is effective for the question stage.

Next, in step S5, the processor 121 acquires the operation data 510. Subsequently, in step S6, the processor 121 determines whether the game start operation has been performed. As a result of the determination, if the start operation has not been performed (NO in step S6), the processor 121 returns to step S5 and repeats the process. Here, if a predetermined operation for cancelling the selection has been performed, the processor 121 may return to the process in step S1 described above.

On the other hand, if the start operation has been performed (YES in step S6), in step S7, the processor 121 performs a preparation process for starting the furniture selection game using the selected question stage. Specifically, the processor 121 refers to the question stage data 503, constructs a virtual space corresponding to the question stage, and arranges various objects including hint furniture articles. In addition, the processor 121 sets the arrangement areas 203 at predetermined positions within the virtual space on the basis of the question stage data 503.

Furthermore, the processor 121 generates the furniture article list data 508 corresponding to the question stage. That is, the processor 121 performs a process of generating an nth arrangement area furniture article list information set 571 corresponding to each arrangement area 203. Specifically, the following process is performed for each of the arrangement areas 203 that are set in the question stage. First, the processor 121 determines to generate an nth arrangement area furniture article list information set 571 corresponding to which arrangement area 203. The method for associating the nth arrangement area furniture article list information set 571 with the arrangement area 203 may be any method, but both are associated with each other by using the value of "n" in the "nth arrangement area" as the value indicated by the operation order information 541. Next, the processor 121 extracts, from the possessed furniture article data 505, furniture articles that conform to the "type" of furniture articles defined for the arrangement area 203 corresponding to the nth arrangement area furniture article list information set 571. The number of furniture articles to be extracted is up to 12, and furniture articles are extracted in an order of a furniture article having a higher score in the question stage. In addition, the scores for the respective furniture articles can be recognized by referring to the furniture article score information 536. Furthermore, the processor 121 determines whether the extracted furniture articles include the "recommended furniture article". If the "recommended furniture article" is included, the processor 121 sets "1" as the display order information 582 such that the "recommended furniture article" is displayed at the front of the furniture article list, and the processor 121 sets a furniture article ID 583 indicating the "recommended furniture article". For each of the other furniture articles, the processor 121 sets the display order information 582 to a random value from 2 to 12 and also sets a furniture article ID 583, thereby generating the nth arrangement area furniture article list information set 571. On the other hand, if the "recommended furniture article" is not included, the processor 121 sets the display order of each extracted furniture article to a random value from 1 to 12, similarly generates the furniture article list data 508 for an nth arrangement area, and stores the furniture article list data 508 in the memory 122.

The processor 121 sets "furniture arrangement" as the game mode 507. Furthermore, the processor 121 initializes other various kinds of data to be used in the furniture selection game as appropriate, if necessary. Then, the processor 121 takes an image of the virtual space including the question stage (the above "room" in this example) in which the hint furniture articles and the like are arranged, using the virtual camera, generates a game image, and displays the game image on the display section 124. Thereafter, upon receiving an operation performed by the user, the furniture selection game using the selected question stage is started.

[Details of Process Regarding Furniture Arrangement]

Next, in step S8, the processor 121 determines whether the game mode 507 is "furniture arrangement". As a result, when the game mode 507 is "furniture arrangement" (YES in step S8), the processor 121 performs a furniture arrangement process in step S9. This process is a process for arranging a furniture article in the arrangement area 203 on the basis of an operation performed by the user.

Figure 22:
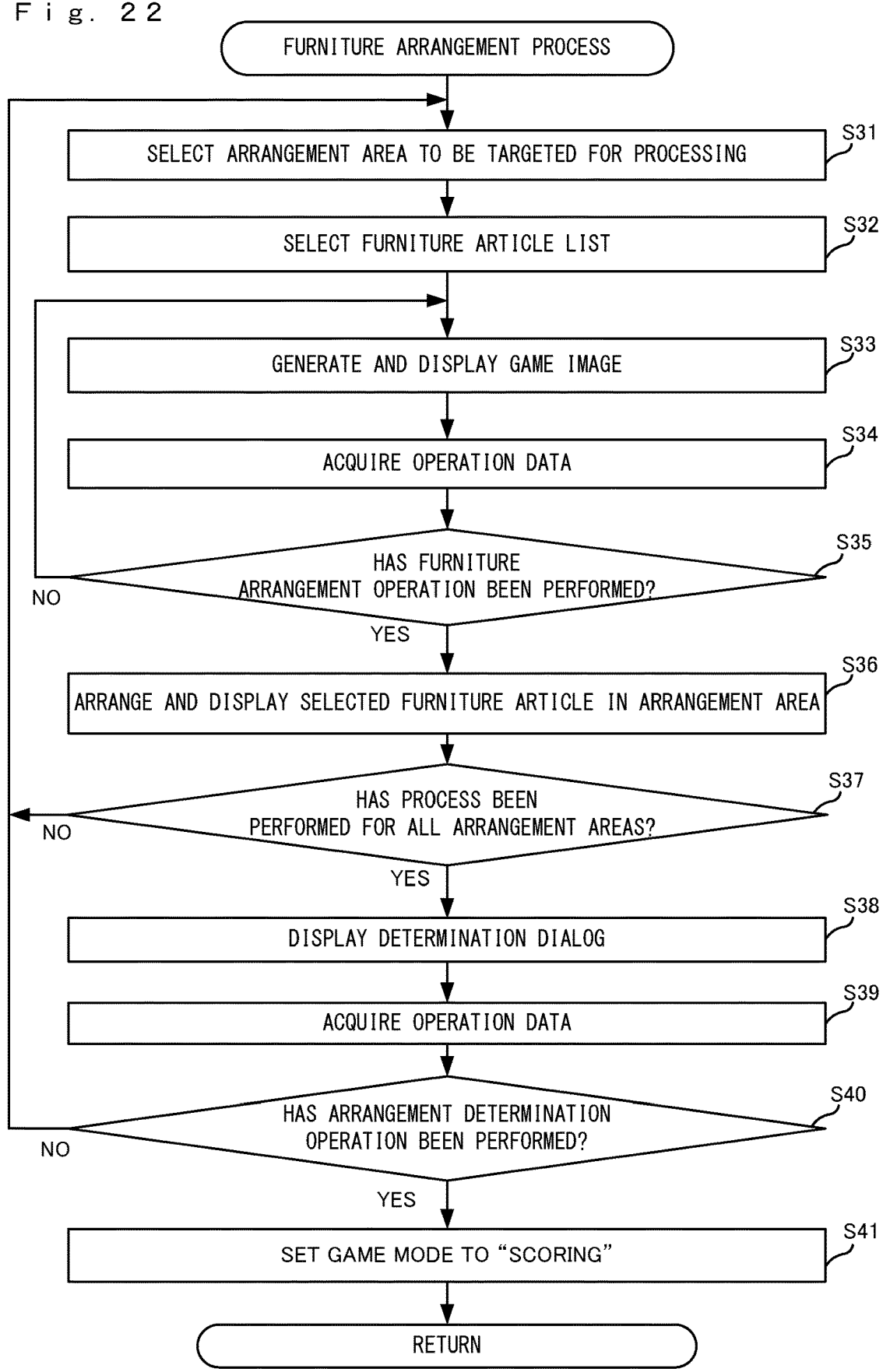
FIG. 22 is a flowchart showing a non-limiting example of a furniture arrangement process in detail.

FIG. 22 is a flowchart showing the furniture arrangement process in detail. First, in step S31, the processor 121 selects an arrangement area 203 to be targeted for processing, on the basis of the operation order information 541.

Next, in step S32, the processor 121 refers to the furniture article list data 508 and selects the nth arrangement area furniture article list information set 571 corresponding to the arrangement area 203 selected as a processing target. Then, the processor 121 generates the furniture article list 202 as described above, on the basis of the nth arrangement area furniture article list information set 571. Next, in step S33, the processor 121 generates a game image (see FIG. 2 described above) including the generated furniture article list 202, and displays the game image on the display section 124.

Next, in step S34, the processor 121 acquires the operation data 510. Subsequently, in step S35, the processor 121 determines whether an operation for furniture arrangement has been performed. Here, the processor 121 determines whether a tapping operation has been performed on any of the furniture articles (or an option image showing "no arrangement") in the furniture article list 202. As a result of the determination, if the operation for furniture arrangement has not been performed (NO in step S35), the processor 121 returns to step S33 described above and repeats the process. On the other hand, if the operation for furniture arrangement has been performed (YES in step S35), in step S36, the processor 121 arranges the selected furniture article in the arrangement area 203 presently targeted for processing. Furthermore, the processor 121 also generates a game image showing a representation of arranging the furniture article in the arrangement area 203 (for example, animation in which the furniture article moves from the furniture article list) as appropriate, and displays the game image. If the option image showing "no arrangement" has been selected, furniture arrangement is not performed in this process, and the processor 121 proceeds to the next process.

Next, in step S37, the processor 121 determines whether the above process has been performed for all the arrangement areas 203, that is, the operation for furniture arrangement has been performed for all the arrangement areas 203. As a result, if any arrangement area 203 for which the process has not been performed is left (NO in step S37), the processor 121 returns to step S31 described above, selects the next arrangement area 203 as a processing target, and repeats the process.

On the other hand, if the process has been performed for all the arrangement areas 203 (YES in step S37), subsequently, in step S38, the processor 121 generates the above-described arrangement determination dialog 209 and displays a game image as shown in FIG. 4 described above.

Next, in step S39, the processor 121 acquires the operation data 510. Subsequently, in step S40, the processor 121 determines whether an arrangement determination operation (a tapping operation on an OK button) has been performed on the arrangement determination dialog 209. As a result, if the determination operation has not been performed (NO in step S40: a tapping operation has been performed on a "Redo" button in FIG. 4), the processor 121 returns to step S31 described above and repeats the process. At this time, the user may be caused to designate an area for which the user is to redo arrangement, or all the arrangement areas 203 may be initialized and the user may be caused to redo arrangement from the beginning.

Meanwhile, if the determination operation has been performed (YES in step S40), the processor 121 sets the game mode 507 to "scoring" in step S41. Then, the processor 121 ends the furniture arrangement process.

[Details of Process Regarding Scoring]

Referring back to FIG. 21, a process in the case where, as a result of the determination in step S8 described above, it is determined that the game mode 507 is not furniture arrangement (NO in step S8) will be described next. In this case, in step S10, the processor 121 determines whether the game mode 507 is "scoring". As a result, if the game mode 507 is "scoring" (YES in step S10), the processor 121 performs a scoring process in step S11. This process is a process regarding calculation of a user score and the advice function.

Figure 23:
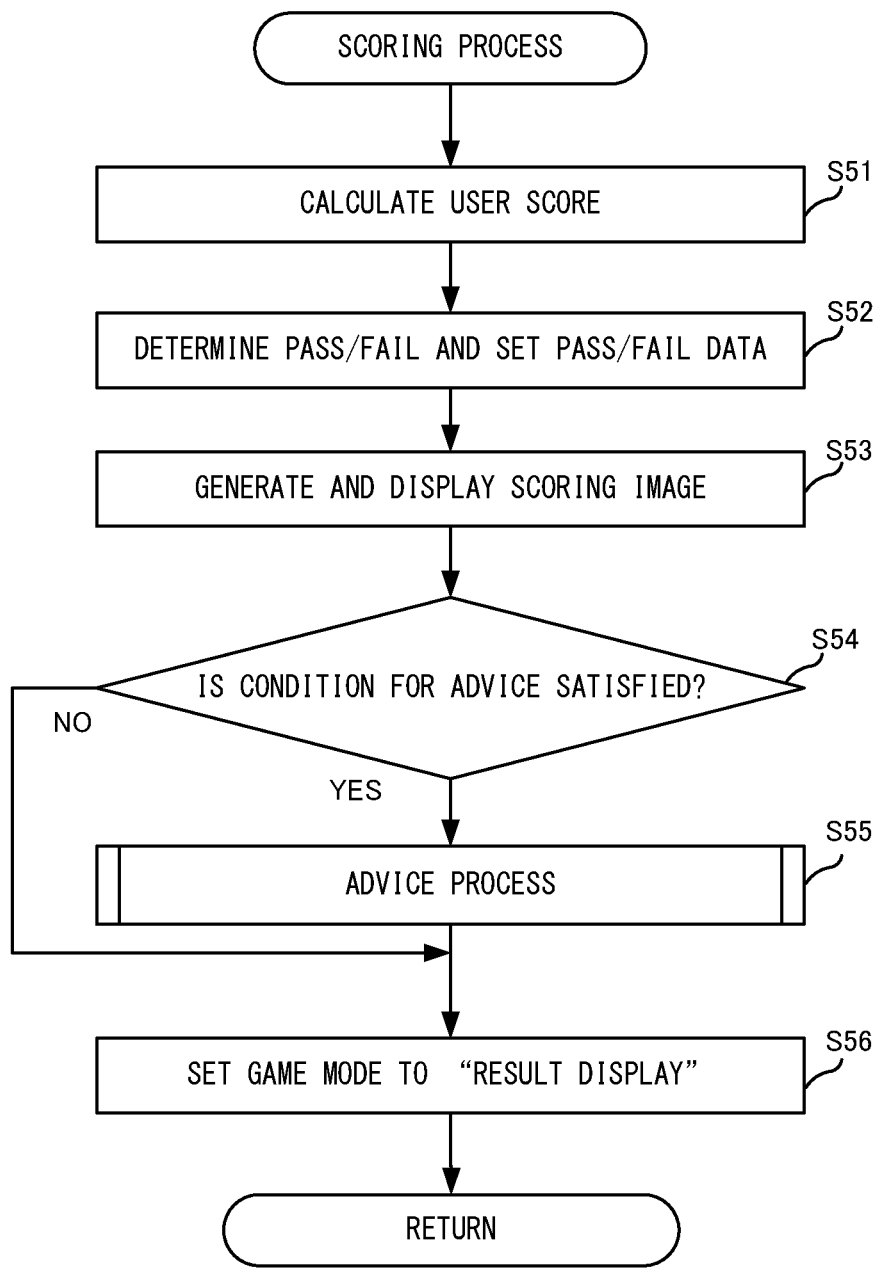
FIG. 23 is a flowchart showing a non-limiting example of a scoring process in detail.

FIG. 23 is a flowchart showing the scoring process in details. First, in step S51, the processor 121 performs a process of calculating a user score. Specifically, the processor 121 calculates a user score by referring to the furniture article score information 536 and summing the scores assigned to the furniture articles arranged in the respective arrangement areas 203, and stores the calculated user score as the user score information 561 in the memory 122. Furthermore, the processor 121 assigns scores to be displayed in the score panels of the judge images 210, on the basis of the calculated user score. This score assignment may be performed, for example, in a random manner or on the basis of a predetermined rule such as a proportion determined for each judge.

Regarding the user score and the scores to be displayed in the judge images 210, in this example, as described above, a user score is calculated, and then scores are assigned as scores of each judge. In another exemplary embodiment, for example, a certain calculation formula may be predefined for each judge. Then, a user score may be calculated by summing scores calculated by the calculation formulas for the respective judges.

Next, in step S52, the processor 121 performs determination as to pass/fail and sets the pass/fail data 509 on the basis of the calculated user score. Specifically, the processor 121 refers to the pass line data 535 of the nth question stage information set 504 corresponding to the present question stage and determines whether the user score is equal to or higher than any pass line. As a result, if the user score has not reached any pass line, the processor 121 sets information indicating a fail, as the pass/fail information 562 of the pass/fail data 509. On the other hand, if the user score is equal to or higher than any pass line, the processor 121 sets information indicating a pass, as the pass/fail information 562. In addition, if the result is a pass, a process of giving a predetermined reward such as the medal to the user is also performed.

Next, in step S53, the processor 121 generates a game image showing the representation of scoring as described above with reference to FIG. 5, and displays the game image on the display section 124. Specifically, the processor 121 generates an image of the score meter 211 on the basis of the calculated user score information 561 and the pass line data 535 defined in the nth question stage information set 504. In addition, the processor 121 sets, as appropriate, the contents of movement regarding the representation such as a speed at which the user score bar 214 extends, on the basis of the user score information 561. Moreover, regarding the scores to be displayed in the score panels of the judge images 210 and determined in step S51 described above, the processor 121 also makes setting of the representation such that the scores are displayed in accordance with movement of the user score bar 214. Then, the processor 121 displays a game image of the representation in which a user score is determined by the judges, on the basis of the set contents of the representation.

Next, in step S54, the processor 121 determines whether the user score satisfies a condition for using the above-described advice function, on the basis of the advice line information 553. In the example of the pass lines and the advice lines described above with reference to FIG. 13, for example, the processor 121 determines whether the user score is equal to or higher than 54 points and less than 72 points. If this condition (hereinafter, a first advice condition) is satisfied, the processor 121 determines that it is possible to use the advice function for the first pass line. In addition, if the first advice condition is not satisfied, the processor 121 determines whether the user score is equal to or higher than 108 points and less than 120 points. If this condition (hereinafter, a second advice condition) is satisfied, the processor 121 determines that it is possible to use the advice function for the second pass line. Moreover, if the second advice condition is also not satisfied, the processor 121 determines whether the user score is equal to or higher than 192 points and less than 200 points. If this condition is satisfied, the processor 121 determines that it is possible to use the advice function for the third pass line. The above example is an example that assumes that any of the pass lines described above with reference to FIG. 13 has not been achieved. If there is any already achieved pass line (for example, this can be recognized on the basis of the achievement information or the like stored in the question stage data 503), determination as to the already achieved pass line and the corresponding advice condition may be skipped. In addition, in this case, if the already achieved pass line is achieved again, predetermined in-game virtual currency may be given to the user instead of giving the medal. Accordingly, motivation to repeatedly play the game can be provided to the user.

As a result of the determination, if the user score does not satisfy any condition for using the advice function (NO in step S54), the processor 121 advances the processing to step S56 described later. On the other hand, if any condition for using the advice function is satisfied, the processor 121 performs an advice process in step S55.

[Details of Advice Process]

Figure 24:
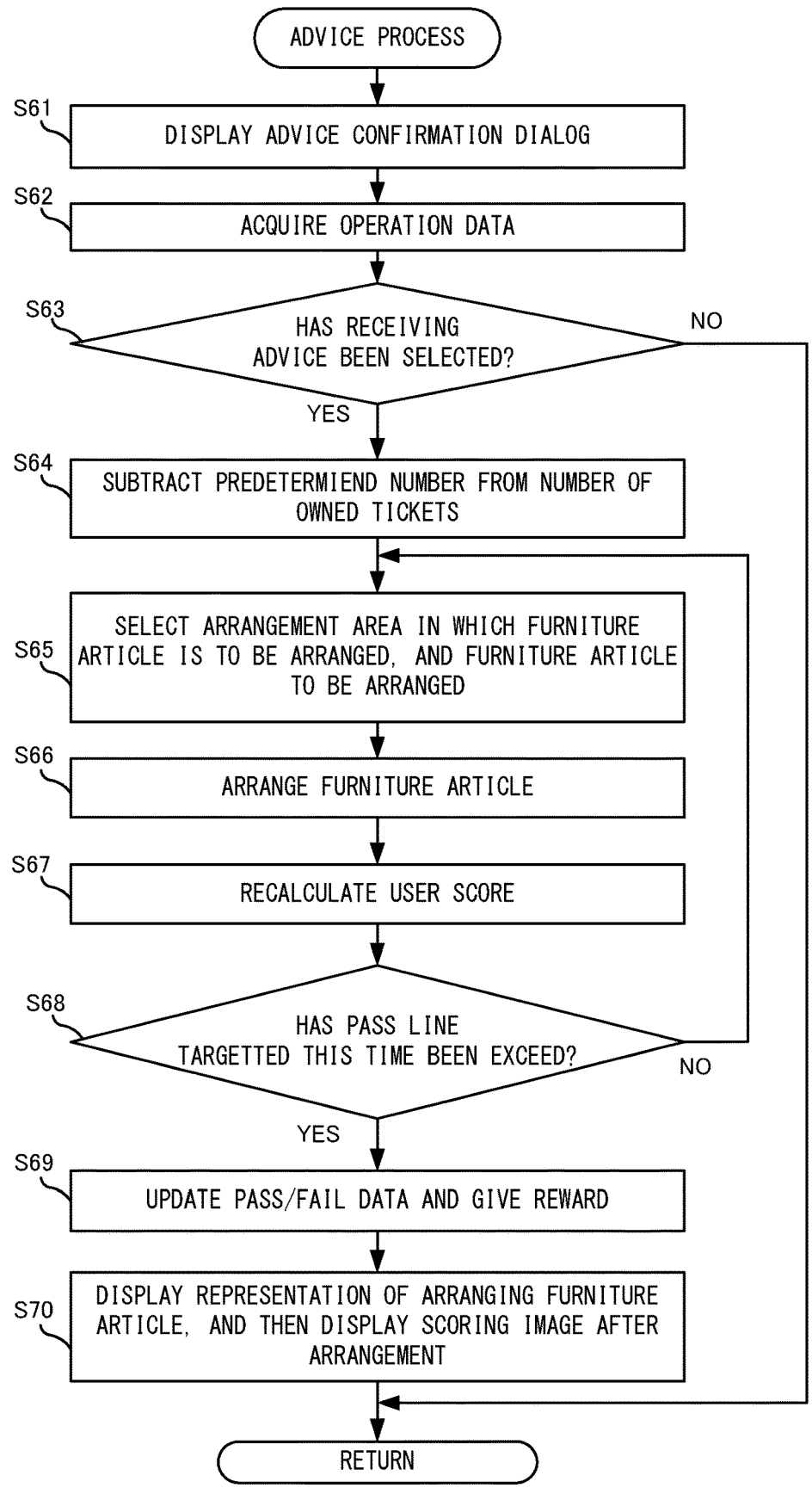
FIG. 24 is a flowchart showing a non-limiting example of an advice process in detail.

FIG. 24 is a flowchart showing the advice process in detail. First, in step S61, the processor 121 generates the advice confirmation dialog 242 as shown in FIG. 11 described above, and displays a game image including the advice confirmation dialog 242, on the display section 124. Then, the processor 121 receives an operation from the user. Next, in step S62, the processor 121 acquires the operation data 510. Subsequently, in step S63, the processor 121 determines whether an operation for selecting receiving advice has been performed on the advice confirmation dialog 242. If the operation for receiving advice has not been performed (NO in step S63: if NO has been selected in the advice confirmation dialog 242 in FIG. 11 described above), the advice process is ended.

On the other hand, if the operation for receiving advice has been performed (YES in step S63), in step S64, the processor 121 performs a process of subtracting a predetermined number of the "tickets" from the possessed ticket number data 506. At this time, if the number of the possessed tickets is not enough, display showing that the number of the possessed tickets is not enough may be performed, and then the advice process may be ended here without subtraction of the predetermined number of the "tickets". In addition, display for guiding the user to buy "tickets", such as displaying a predetermined message or an image for displaying a game image for buying "tickets", may be performed.

Next, in step S65, the processor 121 selects an arrangement area 203 in which a furniture article is to be arranged, and selects a furniture article to be arranged. As described above, in this example, arrangement areas are selected in the following order. First, the arrangement area 203 in which no furniture article has been arranged is preferentially selected. Next, the arrangement area 203 in which a furniture article having a lowest score has been arranged is selected from among the arrangement areas 203 in which furniture articles have already been arranged. After any arrangement area 203 is selected as described above, the processor 121 selects a furniture article to be arranged in the arrangement area 203. In this example, the "recommended furniture article" is used as an object for replacement as described above. Thus, here, the processor 121 selects the "recommended furniture article" of the type corresponding to the arrangement area 203.

Next, in step S66, the processor 121 performs a process of acquiring the data of the "recommended furniture article" from the furniture article database 502 and arranging the "recommended furniture article" in the selected arrangement area 203. That is, if no furniture article has been arranged in the selected arrangement area 203, the processor 121 newly arranges the "recommended furniture article" in the arrangement area 203. In addition, if any furniture article has already been arranged in the selected arrangement area 203, the processor 121 performs a process of replacing the furniture article with the "recommended furniture article". In another exemplary embodiment, without limitation to replacement with the "recommended furniture article", a furniture article having a higher score than the presently arranged furniture article may be selected as a furniture article for replacement.

Next, in step S67, the processor 121 recalculates a user score on the basis of the state of the virtual space (room 201) after the "recommended furniture article" is arranged. That is, recalculation of a user score is performed in consideration of the rearranged furniture article. Next, in step S68, the processor 121 determines whether, as a result of the recalculation, the user score is equal to or higher than the pass line to be achieved this time. As a result, if the user score is still less than the pass line (NO in step S68), the processor 121 returns to step S65 described above, and repeats the process regarding furniture replacement until the user score becomes equal to or higher than the pass line. On the other hand, if the user score is equal to or higher than the pass line (YES in step S68), the processor 121 updates the pass/fail data 509 on the basis of the recalculated user score in step S69. That is, the processor 121 updates the user score information 561 with the recalculated score and information indicating a pass, as the pass/fail information 562. Accordingly, the recalculated user score is reflected in the pass/fail data 509. In addition, a process for giving a reward corresponding to the pass line achieved as a result of the recalculation, to the user, such as giving a medal or unlocking the next stage, is also performed.

Next, in step S70, the processor 121 displays a game image showing a representation of arranging the "recommended furniture article", on the display section 124, and then further displays a game image showing a representation of scoring based on the state of the virtual space after the arrangement. As a result, in the screen in FIG. 12 described above, a representation in which the user score bar 214 extends beyond any pass line is displayed. Accordingly, the user can visually know that the furniture article has been automatically newly arranged or used for replacement, scoring has been performed again, and a pass has been achieved. Thereafter, the advice process is ended.

Referring back to FIG. 23, next, in step S56, the processor 121 sets information indicating "result display" as the game mode 507. Thereafter, the scoring process is ended, for example, when the user performs a predetermined operation on the scoring screen as shown in FIG. 5 or FIG. 12 described above.

[Details of Process of Display of Scoring Result]

Referring back to FIG. 21, a process in the case where, as a result of the determination in step S10 described above, it is determined that the game mode 507 is not "scoring" (NO in step S10) will be described next. In this case, in step S12, the processor 121 performs a result process. This process is a process for presenting a scoring result and displaying a proposal regarding the "recommended furniture article" as described above.

Figure 25:
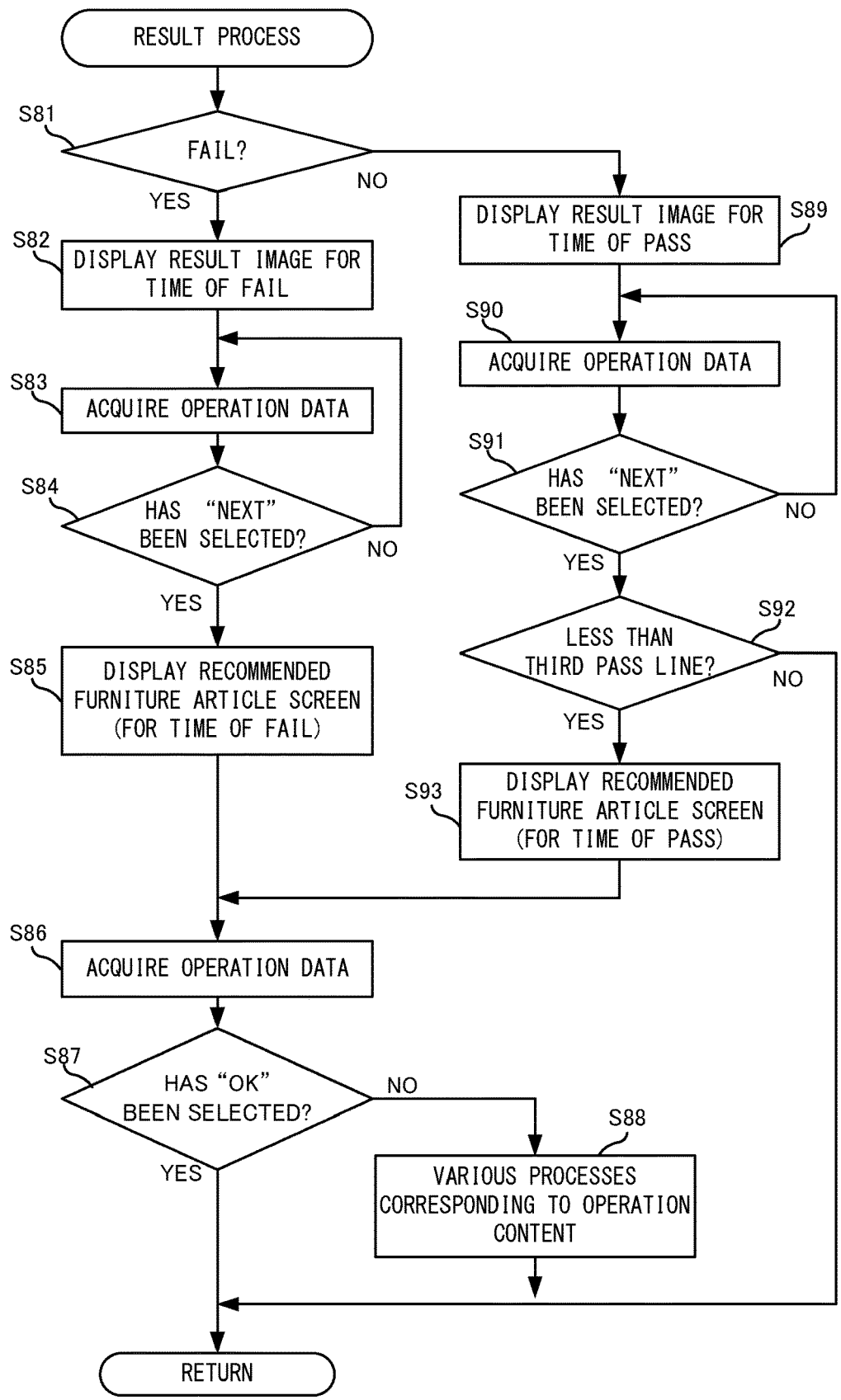
FIG. 25 is a flowchart showing a non-limiting example of a result process in detail.

FIG. 25 is a flowchart showing the result process in detail. In FIG. 25, first, in step S81, the processor 121 refers to the pass/fail data 509 and determines whether the present scoring result is a "fail". As a result of the determination, if the scoring result is a "fail" (YES in step S81), in step S82, the processor 121 generates a scoring result image for the time of a fail as illustrated in FIG. 8 described above, on the basis of the pass/fail data 509, and displays the scoring result image on the display section 124. Thereafter, the processor 121 receives an operation from the user.

Next, in step S83, the processor 121 acquires the operation data 510. Subsequently, in step S84, the processor 121 determines whether an operation of pressing the "next" button has been performed on the scoring result image for the time of a fail. If the "next" button has not been pressed (NO in step S84), the processor 121 returns to step S83 described above and repeats the process.

If the "next" button has been pressed (YES in step S84), subsequently, in step S85, the processor 121 generates a game image including information about the "recommended furniture article" (for the time of a fail) shown in FIG. 9 described above and a guideline for the "recommended furniture article" and an "OK" button, and displays the game image on the display section 124. Thereafter, the processor 121 receives an operation from the user.

Next, in step S86, the processor 121 acquires the operation data 510. Subsequently, in step S87, the processor 121 determines whether an operation of pressing the "OK" button has been performed, on the basis of the operation data 510. As a result, if the "OK" button has been pressed (YES in step S87), the processor 121 ends the result process. On the other hand, if the "OK" button has not been pressed (NO in step S87), a process corresponding to the operation content indicated by the operation data 510 is performed as appropriate in step S88. Specifically, if a tapping operation has been performed on any guideline button 232, a process corresponding to the guideline button 232 is performed. In this example, a process of transitioning to a game image for the lottery process for acquiring a "furniture article" or registering a material for the "recommended furniture article" in the "favorites list" is performed.

Next, a process in the case where, as a result of the determination in step S81 described above, the scoring result is not a "fail" (NO in step S81) will be described. In this case, in step S89, the processor 121 generates a scoring result image for the time of a pass as illustrated in FIG. 6 described above, on the basis of the pass/fail data 509, and displays the scoring result image on the display section 124. Thereafter, the processor 121 receives an operation from the user.

Next, in step S90, the processor 121 acquires the operation data 510. Subsequently, in step S91, the processor 121 determines whether an operation of pressing the "next" button has been performed on the scoring result image for the time of a pass. If the "next" button has not been pressed (NO in step S91), the processor 121 returns to step S90 described above and repeats the process. On the other hand, if the "next" button has been pressed (YES in step S91), in step S92, the processor 121 refers to the user score information 561 and the pass line data 535 and determines whether the user score is less than the third pass line. As a result, if the user score is less than the third pass line (YES in step S92), in step S93, the processor 121 generates a game image including information about the "recommended furniture article" for the time of a pass and a guideline for the "recommended furniture article" and an "OK" button as shown in FIG. 7 described above, and displays the game image on the display section 124. Thereafter, the processor 121 receives an operation from the user. Thereafter, the processor 121 advances the processing to step S86 described above.

On the other hand, as a result of the determination in step S92 described above, if the user score is not less than the third pass line, that is, if the user score is equal to or higher than the third pass line (NO in step S92), the processor 121 ends the result process.

Referring back to FIG. 21, when the result process is ended, the processor 121 returns to step S1 described above and repeats the process.

This is the end of the detailed description of the furniture selection game processing according to the exemplary embodiment.

As described above, in the exemplary embodiment, a game for acquiring a high score by arranging furniture articles possessed by the user in a question stage in which hint furniture articles are arranged in advance, is provided. Accordingly, the fun of using furniture articles collected within the game can be provided to the user.

Pass lines are predefined for each question stage, and a predetermined reward is given to the user by acquiring a score exceeding any of the pass lines as a result of scoring. Moreover, as a result of scoring, if a score close to any of the pass lines to some extent is acquired, the advice function can be used on the condition that tickets are consumed. Then, when the user uses the advice function, control for changing the game state such that the pass line is achieved is performed. Specifically, the game state (the state of the room 201) is changed to a state where furniture articles with which the pass line can be achieved are arranged. That is, by using the advice function, it is possible to ensure that the pass line is exceeded. Accordingly, it is possible to advance the game efficiently in terms of time as compared to the case of starting the game over gain when the pass line is not reached.

Moreover, "a little more to a pass" is presented to the user, and then an option for "ensuring a pass by exchange of a compensation" is also provided to the user. Therefore, stronger motivation to perform "exchange of a compensation" can be provided.

[Modifications]

Regarding the advice function, in the above exemplary embodiment, as an example, if the user selects receiving advice in the advice confirmation dialog 242, the "recommended furniture article" that makes it possible to achieve the pass line is automatically arranged, and scoring is performed again. In another exemplary embodiment, if the user selects receiving advice, the "recommended furniture article" may be merely presented. That is, information about the "recommended furniture article" by which the pass line can be reached may be merely presented, and the user may be caused to perform an actual arrangement operation. In this case, a final arrangement operation is left to the user, and it is possible to reach the pass line if the presented recommended furniture article is merely arranged, so that this state can be considered as a state where achievement of the pass line is "guaranteed". In addition, in this case, whether the user possesses the "recommended furniture article" may also be determined, and, if the user does not own the "recommended furniture article", control may be performed such that the advice confirmation dialog 242 is not displayed. That is, only when the user possesses the "recommended furniture article", the advice confirmation dialog 242 may be displayed. Then, if receiving advice is selected, the "recommended furniture article" may be merely presented as described above. In other words, by such presentation of advice, the game state can be changed such that the same in-game effect as when the pass line is achieved is caused.

In the above example, the "recommended furniture article" is predefined. However, in another exemplary embodiment, definition corresponding to the "recommended furniture article" may be eliminated. In this case, for example, a furniture article that gives a higher score among the furniture articles possessed by the user may be used instead of the "recommended furniture article".

In the above example, the "type" of furniture articles that can be arranged in a certain arrangement area 203 is limited. In another exemplary embodiment, the "type" of such arrangeable furniture articles does not have to be limited. Even other types of furniture articles, even "desks" and "chairs", may also be able to be arranged in a certain arrangement area 203.

In the above example, consumption of the "tickets" that are a kind of virtual currency that can also be obtained by so-called billing is exemplified as a condition for receiving advice. However, the virtual currency is not limited to the "tickets", and, for example, currency that is not handled in the real world, such as "Orb" and "Jewel", may be handled as the virtual currency.

Moreover, the process of decreasing the tickets as a condition for receiving advice as described above can also be considered as a process of changing a predetermined parameter as a condition for receiving advice. Thus, in another exemplary embodiment, without limitation to the virtual currency such as the tickets, a process of decreasing the number of other predetermined possessed items may be performed. In addition, the parameter may be, for example, stamina, energy, a friendship level, or the like, and, to receive advice, these parameters may be changed by a predetermined value. The "change" is not limited to decreasing the value of the parameter, and the value of the parameter may be increased.

Furthermore, in another exemplary embodiment, as a more direct way, payment of "cash" may be set as the condition for receiving advice. For example, the information processing apparatus in which the game is executed may be provided with a coin slot. When the user desires to receive advice, the user may insert a predetermined amount of coins into the coin slot. When the insertion of the coins is confirmed, the above-described advice function may be performed.

Regarding the pass line, a range may be given to the value of the pass line and be set as a pass range. For example, the range of 60 points to 80 points may be defined as a first pass range instead of the above first pass line. In this case, the above advice range corresponding to the first pass range may be defined. The advice range may be calculated and set, for example, on the basis of the lower limit of the pass range. As an example, the range of 50 to 59 points may be set as a first advice range.

Regarding the above-described processing, application of the processing is not limited to application to the furniture selection game, and the processing can be applied to other games. Specifically, the above-described processing can be applied to general game processing in which a predetermined "achievement condition" corresponding to the pass line is set. For example, in a mahjong game, the case where acquisition of a predetermined score is set as an achievement condition and a round ends when a hand that satisfies the achievement condition nearly becomes completed (becomes completed if one more desired tile is obtained), is assumed. In such a case, predetermined display corresponding to the advice confirmation dialog 242 may be performed, and a process of replacing part of tiles such that a "hand" that satisfies the achievement condition is completed may be performed in exchange for changing a certain parameter such as payment of virtual currency. In addition, for example, in a one-on-one fighting game, the case where "time runs out" when a power gauge of an opponent character is reduced by 99% (in this case, reducing the gauge by 100% is an achievement condition) is assumed. In such a case, predetermined display corresponding to the advice confirmation dialog 242 may be performed, and a process of attacking the opponent character such that the remaining 1% of the gauge is reduced may be performed in exchange for changing a certain parameter such as payment of virtual currency. As a result, a process for the case where the gauge of the opponent character is reduced by 100% may be performed. Moreover, for example, a jump action game in which a player character is moved within a virtual space for the purpose of reaching a predetermined check point, is assumed. In this case, even if the game cannot be advanced due to running out of time or the like when the player character comes close to the check point to some extent (in a state where a condition corresponding to the advice line is achieved), predetermined display corresponding to the advice confirmation dialog 242 may be performed, and a process of automatically moving the player character to the position of the check point may be performed in exchange for changing a certain parameter such as payment of virtual currency.

In the above exemplary embodiment, the case where the game processing is performed by a single information processing apparatus has been described as an example. However, regarding the subject that performs the processing as described above, a configuration other than the above configuration may be adopted. For example, in another exemplary embodiment, an information processing apparatus and a predetermined server may be configured to be communicable with each other, and the various types of data and the information processing described above may be partially stored and executed at the predetermined server. A system on the server side may be configured from a plurality of information processing apparatuses and processing to be performed on the server side may be divided and performed by the plurality of information processing apparatuses. In such a case, for example, data about users who use the game is stored in the server on a user-by-user basis. Then, at the start of the game, a user is caused to perform a process of logging in to the server, necessary data is downloaded from the server onto the information processing apparatus 102, and the information processing apparatus 102 and the predetermined server cooperate to perform the above-described information processing.

While the exemplary embodiments have been described in detail, the foregoing description is in all aspects illustrative and not restrictive. It is to be understood that numerous other modifications and variations can be devised without departing from the scope of the exemplary embodiments.

What is claimed is:

1. A computer-readable non-transitory storage medium having stored therein an information processing program to be executed in a computer of an information processing apparatus, the information processing program comprising instructions configured to cause the computer to:
control, within a game space of a video game, at least one game object based on input provided by a user;
calculate a score on the basis of how the at least one game object has been controlled by the user;
determine whether the score satisfies a first achievement condition based on the score being equal to or higher than a first score;
when the score does not satisfy the first achievement condition, determine whether the calculated score satisfies a second achievement condition based on the score being equal to or higher than a second score that is associated with the second achievement condition;
based on the score satisfying the first achievement condition, cause an in-game effect that corresponds to the first achievement condition;
based on determination that the score satisfies the second achievement condition and in exchange for change of an exchange parameter, automatically change a game state within the game space of the video game in which the at least one game object has already been controlled;
display the game space based on the automatically changed game state;
recalculate the score on the basis of how the game state of the video game has been changed;
based on determination that the recalculated score satisfies the first achievement condition, cause the in-game effect to occur within the video game, wherein when the score does not satisfy both the first and second achievement condition, the in-game effect is not performed; and
give a predetermined reward to the user based on determination that the first achievement condition has been satisfied.

2. The storage medium according to claim 1, wherein the information processing program comprises further instructions that cause the computer to output a display screen that includes graphics that are based on both the calculated score and the first score.

3. The storage medium according to claim 2, wherein the graphics include a meter that graphically shows the calculated score in relation to at least the first score.

4. The storage medium according to claim 3, wherein the first score is represented in the graphics with an indicator that is present on the meter.

5. The storage medium according to claim 3, wherein multiple indicators, that each correspond to a different achievement score, are displayed in connection with the meter.

6. The storage medium according to claim 2, wherein the second score that is associated with the second achievement condition is not displayed or hidden from the user.

7. The storage medium according to claim 1, wherein the information processing program comprises further instructions that cause the computer to, as part of automatically changing the game state, automatically change the at least one game object that has already been controlled.

8. The storage medium according to claim 7, wherein the position of the at least one game object within the game space is changed.

9. The storage medium according to claim 1, wherein the information processing program comprises further instructions that cause the computer to, as part of automatically changing the game state, automatically modify at least one parameter of a virtual object within the game space.

10. The storage medium according to claim 1, wherein the information processing program comprises further instructions that cause the computer to sum a plurality of sub-scores that are each associated with different objects within the game space,
wherein the score that is calculated is based on the sum of the sub-scores.

11. The storage medium according to claim 10, wherein the sub-scores are additionally based on where a respective object is located within the game space.

12. The storage medium according to claim 1, wherein the information processing program comprises further instructions that cause the computer to:
determine the second score as a fraction of the first score.

13. The storage medium according to claim 1, wherein the information processing program comprises further instructions that cause the computer to:
  determine whether the calculated score satisfies any of a plurality of first achievement conditions,
  wherein the plurality of first achievement conditions includes the first achievement condition,
  wherein each of the plurality of the first achievement conditions is associated with different score value, with the first score being the score value for the first achievement condition,
  wherein each of the plurality of the achievement conditions is associated with one of a plurality of second achievement conditions, which include the second achievement condition.

14. The storage medium according to claim 13, wherein each of the plurality of the second achievement conditions is set in relation to a corresponding one of the plurality of first achievement conditions based on a difficulty of the corresponding first achievement condition.

15. The storage medium according to claim 14, wherein as the difficulty of the corresponding first achievement condition increases, the closer the associated second achievement condition will be set to the corresponding first achievement condition.

16. The storage medium according to claim 1, wherein the information processing program comprises further instructions that cause the computer to:
  display a plurality of selectable game objects that are indicated as being possessed by the user,
  wherein the plurality of selectable game objects are arranged in an order that is based on sub scores that are associated with each one of the plurality of selectable game objects.

17. The storage medium according to claim 1, wherein the information processing program comprises further instructions that cause the computer to:
  when the score does not satisfy the first achievement condition, output a display screen that includes a recommendation.

18. The storage medium according to claim 17, wherein the recommendation includes an image to guide the user in how an action within the video game may performed to carry out achieving the first achievement condition.

19. The storage medium according to claim 1, wherein the automatically changed game state includes automatically performing a game action within the game space.

20. An information processing apparatus comprising:
  at least one hardware processor that is configured to execute computer executable instructions that cause the at least one hardware processor to perform operations comprising:
    controlling, within a game space of a video game, at least one game object based on input provided by a user;
    calculating an achievement value on the basis of a current game state of the video game that includes at least one game object that has been controlled by the user;
    determining whether the achievement value satisfies a first achievement based on the achievement value being equal to or higher than a first threshold;
    when the achievement value does not satisfy the first achievement, determining that the calculated achievement value satisfies a sub-condition that is linked to the first achievement based on the calculated achievement value being less than the first threshold and equal to or higher than a second threshold that is associated with the sub-condition;
    based on the achievement value satisfying the first achievement, causing an in-game effect that corresponds to the first achievement;
    based on determination that the calculated achievement value satisfies the sub-condition and in exchange for change of an exchange parameter, automatically changing the game state within the game space of the video game in which the at least one game object has already been controlled;
    displaying the game space based on the automatically changed game state;
    recalculating the achievement value on the basis of how the game state of the video game has been changed;
    based on determination that the recalculated achievement value satisfies the first achievement, causing the in-game effect to occur within the video game, wherein when the achievement value does not satisfy both the first and second achievement condition, the in-game effect is not performed; and
    setting a reward for the user based on determination that the first achievement has been satisfied.

21. An information processing system comprising:
  at least one hardware processor, the at least one hardware processor included in the information processing system singly or in cooperation configured to execute operations comprising:
    controlling, within a game space of a video game, at least one game object based on input provided by a user;
    calculating a score on the basis of how the at least one game object has been controlled by the user;
    determining whether the score satisfies a first achievement condition based on the score being equal to or higher than a first score;
    when the score does not satisfy the first achievement condition, determining that the calculated score satisfies a second achievement condition based on the score being equal to or higher than a second score that is associated with the second achievement condition;
    based on the score satisfying the first achievement condition, causing an in-game effect that corresponds to the first achievement condition;
    based on determination that the score satisfies the second achievement condition and in exchange for change of an exchange parameter, automatically changing a game state within the game space of the video game in which the at least one game object has already been controlled;
    displaying the game space based on the automatically changed game state;
    recalculating the score on the basis of how the game state of the video game has been changed;
    based on determination that the recalculated score satisfies the first achievement condition, causing the in-game effect to occur within the video game, wherein when the score does not satisfy both the first and second achievement condition, the in-game effect is not performed; and
    awarding a predetermined reward to the user based on determination that the first achievement condition has been satisfied.

22. An information processing method comprising:
  controlling, within a game space of a video game, at least one game object based on input provided by a user;

calculating a score on the basis of how the at least one game object has been controlled by the user;

determining whether the score satisfies a first achievement condition based on the score being equal to or higher than a first score;

when the score does not satisfy the first achievement condition, determining that the calculated score satisfies a second achievement condition based on the score being equal to or higher than a second score that is associated with the second achievement condition;

based on the score satisfying the first achievement condition, causing an in-game effect that corresponds to the first achievement condition;

based on determination that the score satisfies the second achievement condition and in exchange for change of an exchange parameter, automatically changing a game state within the game space of the video game in which the at least one game object has already been controlled;

displaying the game space based on the automatically changed game state;

recalculating the score on the basis of how the game state of the video game has been changed;

based on determination that the recalculated score satisfies the first achievement condition, causing the in-game effect to occur within the video game, wherein when the score does not satisfy both the first and second achievement condition, the in-game effect is not performed; and awarding a predetermined reward to the user based on determination that the first achievement condition has been satisfied.

* * * * *